United States Patent
Kung et al.

(10) Patent No.: US 8,030,902 B2
(45) Date of Patent: Oct. 4, 2011

(54) METHOD FOR CHARGING BATTERY MODULE IN MULTIPLE STAGES

(75) Inventors: Shao-Tsu Kung, Taipei (TW);
Chia-Chang Chen, Taipei (TW);
Chih-Tarng Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 713 days.

(21) Appl. No.: 12/055,319

(22) Filed: Mar. 26, 2008

(65) Prior Publication Data

US 2008/0309293 A1 Dec. 18, 2008

(30) Foreign Application Priority Data

Jun. 14, 2007 (TW) .............................. 9612485 A

(51) Int. Cl.
*H02J 7/00* (2006.01)
(52) U.S. Cl. ....................................... 320/160; 320/125
(58) Field of Classification Search .................. 320/160, 320/125
See application file for complete search history.

(56) References Cited

U.S. PATENT DOCUMENTS

| | | | | |
|---|---|---|---|---|
| 5,686,815 A * | 11/1997 | Reipur et al. | .................. | 320/116 |
| 5,818,202 A * | 10/1998 | Miyamoto et al. | ............. | 320/125 |
| 6,104,165 A * | 8/2000 | Miyamoto et al. | ............. | 320/125 |
| 6,552,514 B2 * | 4/2003 | Yang | .............................. | 320/125 |
| 2006/0139007 A1 * | 6/2006 | Kim | ................................ | 320/134 |

FOREIGN PATENT DOCUMENTS

TW M250713 11/2004

* cited by examiner

*Primary Examiner* — M'Baye Diao
(74) *Attorney, Agent, or Firm* — Jianq Chyun IP Office

(57) ABSTRACT

A method for charging a battery module including a plurality of parallelly-connected battery cell sets in multiple stages is provided. In the present invention, a constant current charging is applied for charging the battery module in an initial stage of charging through the method of voltage control or current control. Then, the charging current is lowered substantially to reduce the charging speed when the voltage of one of the battery cell sets exceeds a safety value or a total voltage of the battery module itself reaches a rated voltage. Accordingly, a safety problem of the battery can be avoided and battery life can be prolonged.

19 Claims, 16 Drawing Sheets

US 8,030,902 B2

METHOD FOR CHARGING BATTERY MODULE IN MULTIPLE STAGES

CROSS-REFERENCE TO RELATED APPLICATION

This application claims the priority benefit of Taiwan application serial no. 96121485, filed on Jun. 14, 2007. The entirety the above-mentioned patent application is hereby incorporated by reference herein and made a part of specification.

BACKGROUND OF THE INVENTION

1. Field of the Invention

The present invention relates to a method for charging a battery module. More particularly, the present invention relates to a method for charging a smart battery module in multiple stages.

2. Description of Related Art

With increasing performance of a processor, increasing of application programs, and advancing of graphic functions, power requirement of a portable computer is increased accordingly. To cope with the power requirement of the portable computer during normal operation thereof, a plurality of parallelly-connected battery cell sets is generally connected in serial and assembled in a battery module, so as to provide sufficient power for the portable computer.

As battery capacity increases, how to rapidly and safely charge the battery module has become one of the major subjects to various manufacturers. Due to special design of the battery module, the power of the battery module may be varied in different time points or under different charging environment, and therefore a plurality of charging methods are developed based on the above features of the battery module.

A power management circuit disclosed in Taiwan patent No. 250713 is used for controlling charging parameters provided to a battery. FIG. 1 is a block diagram of a conventional power management circuit. Referring to FIG. 1, a power management circuit 100 includes a power control circuit 110, a control signal generating circuit 120 and a current control circuit 130. The power control circuit 110 is used for providing a power control signal representing an output power level of a direct current (DC) power supply, and the control signal generating circuit 120 is used for reducing the charging parameters provided to a battery when the power output level exceeds a predetermined power threshold level. Moreover, the current control circuit 130 is used for providing a current control signal representing a current output level of the DC power supply. The control signal generating circuit 120 may further compare the current control signal to a current threshold signal representing a current threshold level, and when the current output level exceeds the current threshold level, the control signal generating circuit 120 may further reduce the charging parameters provided to the battery. As described above, in the conventional technique, when the power of the battery reaches a current threshold level during battery charging, the power supplied for battery charging is then reduced.

FIG. 2 is a schematic diagram illustrating a charging state of a conventional battery. Referring to FIG. 2, a charging method thereof includes two charging stages, wherein a constant current charging is applied to a first stage ($t=0 \sim t_1$) thereof, and a charging curve 210 represents variations of voltage $V_{PC}$ of a battery module. When the voltage $V_{PC}$ of the battery module reaches a voltage $V_{inc}$ provided by a charger, a second charging stage ($t=t_1 \sim t_2$) is started, by which a constant voltage charging is applied, until the battery module is fulfilled ($t=t_2$). According to such method, battery charging is only performed according to an overall voltage of the battery module, and can not be adjusted according to the charging state of each parallelly-connected battery cell set. However, an initial voltage and the charging state of each parallelly-connected battery cell set may be different, and therefore a problem that the battery module is probably still under charging if the voltage of a certain parallelly-connected battery cell set exceeds a safety value (while the overall voltage of the battery module does not exceed the safety value) may be occurred, and such problem not only reduces lifespan of the parallelly-connected battery cell sets, but also leads to a risk of over charging of the battery.

FIG. 3 is a schematic diagram illustrating a charging state of a conventional battery. Referring to FIG. 3, different from the aforementioned method, in the present charging method, the voltage of each parallelly-connected battery cell set in the battery module may be detected, and charging mode of the whole battery module may be adjusted according to a maximum value of the detected voltages. In detail, the constant current charging is still applied to the first charging stage ($t=0 \sim t_1$), and a curve 310 represents variations of a maximum voltage $V_{emax}$ detected from the parallelly-connected battery cell sets of the battery module, and a curve 320 represents variations of a minimum voltage $V_{emin}$ detected from the parallelly-connected battery cell sets of the battery module. When the maximum voltage $V_{emax}$ of the parallelly-connected battery cell sets reaches a rated voltage $V_{coff}$ that the parallelly-connected battery cell sets may bear, the power supplied to a charger thereof is then cut off, and now the maximum voltage $V_{emax}$ of the parallelly-connected battery cell sets drops accordingly until the maximum voltage $V_{emax}$ of the parallelly-connected battery cell sets drops to a lower limit value $V_{con}$ thereof, and then the power supplied to the charger is restored to increase the maximum voltage $V_{emax}$ of the parallelly-connected battery cell sets. Again, the power supplied to the charger is cut off when the maximum voltage $V_{emax}$ of the parallelly-connected battery cell sets reaches the rated voltage $V_{coff}$. The charger is repeatedly turned on/off until all the parallelly-connected battery cell sets are fulfilled. In the second charging stage ($t=t_1 \sim t_2$), the value of the charging current is determined according to the variations of the minimum voltage $V_{emin}$ detected from the parallelly-connected battery cell sets of the battery module, wherein when the minimum voltage $V_{emin}$ of the parallelly-connected battery cell set exceeds a voltage $V_{incc}$ supplied to the parallelly-connected battery cell set by the charger, the second charging stage is started, by which the value of the charging current is gradually adjusted, and the power is also discontinuously supplied to the charger according to the variations of the maximum voltage $V_{emax}$ of the parallelly-connected battery cell sets until the battery is fulfilled ($t=t_2$). Though the aforesaid method, the problem of over charging on an individual parallelly-connected battery cell set may be solved, it has to take a relatively long time to charge the battery module as the power of the charger is discontinuously supplied. Moreover, frequent charge and discharge of the battery may reduce the lifespan thereof, which is still not an optimal charging method.

SUMMARY OF THE INVENTION

Accordingly, the present invention is directed to a method for charging a battery module in multiple stages, in which by detecting voltage variations of each parallelly-connected battery cell set in the battery module, and reducing a charging current thereof when the voltage of the parallelly-connected battery cell set reaches a safety value for a current difference value, so as to protect the parallelly-connected battery cell sets from over charging.

The present invention is directed to a method for charging a battery module in multiple stages, in which by detecting voltage variations of each parallelly-connected battery cell set of the battery module, and suitably adjusting a charging current thereof when the voltage of the parallelly-connected battery cell set reaches a safety value, the parallelly-connected battery cell set then may be protected from over charging.

To achieve the aforementioned and other objectives, the present invention provides a method for charging a battery module in multiple stages, which is suitable for the battery module including a plurality of parallelly-connected battery cell sets. The method includes the following steps: a. adjusting power supplied to the battery module for maintaining the battery module to be charged with a first predetermined current via constant current charging; b. determining whether or not voltage of each parallelly-connected battery cell set in the battery module reaches a first predetermined voltage; c. adjusting the power supplied to the battery module if the voltage of one of the parallelly-connected battery cell sets reaches the first predetermined voltage, so as to maintain the parallelly-connected battery cell set with a maximum voltage to be charged with a second predetermined current via the constant current charging, wherein the second predetermined current equals to the first predetermined current minus a current difference value; d. determining whether or not the voltage of each parallelly-connected battery cell set in the battery module reaches a second predetermined voltage; e. adjusting the power supplied to the battery module if the voltage of one of the parallelly-connected battery cell sets reaches the second predetermined voltage, so as to maintain the parallelly-connected battery cell set having the maximum voltage to be charged with the second predetermined voltage via constant voltage charging; f. determining whether or not the battery module is fulfilled; g. continuously charging the parallelly-connected battery cell set having the maximum voltage with the second predetermined voltage via the constant voltage charging until the battery module is fulfilled if the battery module is not fulfilled.

In an embodiment of the present invention, the step c further includes following steps. The power supplied to the battery module is adjusted when the voltage of one of the parallelly-connected battery cell sets reaches the first predetermined voltage, so as to maintain the parallelly-connected battery cell set having the maximum voltage to be charged with the first predetermined voltage via the constant voltage charging. Then, whether the current of the parallelly-connected battery cell set having the maximum voltage reaches a third predetermined current is determined. When the current of the parallelly-connected battery cell set having the maximum voltage reaches the third predetermined value, the power supplied to the battery module is continuously adjusted, so as to maintain the parallelly-connected battery cell set having the maximum voltage to be charged with the second predetermined current via the constant current charging.

In an embodiment of the present invention, if the method of adjusting the power supplied to the battery module is to adjust a charging current thereof, the step e. of adjusting the power supplied to the battery module to maintain the battery module to be charged with the second predetermined voltage via the constant voltage charging includes: e1. reducing the charging current supplied to the battery module by a level; e2. determining whether or not the voltage of each parallelly-connected battery cell set in the battery module reaches the second predetermined voltage; e3. reducing the charging current supplied to the battery module by the level again if the voltage of one of the parallelly-connected battery cell sets reaches the second predetermined voltage; e4. repeatedly performing the steps e2. and e3., so as to maintain the battery module to be charged with the second predetermined voltage via the constant voltage charging.

In an embodiment of the present invention, if the method of adjusting the power supplied to the battery module is to adjust a charging voltage thereof, the step e. of adjusting the power supplied to the battery module to maintain the battery module to be charged with the second predetermined voltage via the constant voltage charging includes: e1. reducing the charging voltage supplied to the battery module by a level; e2. determining whether or not the voltage of each parallelly-connected battery cell set in the battery module reaches the second predetermined voltage; e3. reducing the charging voltage supplied to the battery module by the level again if voltage of one of the parallelly-connected battery cell sets reaches the second predetermined voltage; e4. repeatedly performing the steps e2. and e3., so as to maintain the battery module to be charged with the second predetermined voltage via the constant voltage charging.

In an embodiment of the present invention, the first predetermined voltage and the second predetermined voltage are a maximum voltage that the parallelly-connected battery cell sets may bear for safe operation. In another embodiment, the first predetermined voltage equals to the maximum voltage that the parallelly-connected battery cell sets may bear for safe operation minus a voltage difference value, and the second predetermined voltage equals to the maximum voltage that the parallelly-connected battery cell sets may bear for safe operation.

The present invention provides a method for charging a battery module in multiple stages, which is suitable for a battery module, the method includes the following steps: a. adjusting power supplied to the battery module to maintain the battery module to be charged with a first predetermined current via constant current charging; b. determining whether or not the voltage of the battery module reaches a first predetermined voltage; c. adjusting the power supplied to the battery module if the voltage of the battery module reaches the first predetermined voltage, so as to maintain the battery module to be charged with a second predetermined current via the constant current charging, wherein the second predetermined current equals to the first predetermined current minus a current difference value; d. determining whether or not the voltage of the battery module reaches a second predetermined voltage; e. adjusting the power supplied to the battery module if the voltage of the battery module reaches the second predetermined voltage, so as to maintain the battery module to be charged with the second predetermined voltage via constant voltage charging; f. determining whether or not the battery module is fulfilled; g. continuously charging the battery module with the second predetermined voltage via the constant voltage charging until the battery module is fulfilled if the battery module is not fulfilled.

In an embodiment of the present invention, the step c further includes: adjusting the power supplied to the battery module when the voltage of the battery module reaches the first predetermined voltage, so as to maintain the battery module to be charged with the first predetermined voltage via the constant voltage charging; and determining whether or not current of the battery module reaches a third predetermined current; and continuously adjusting the power supplied to the battery module when the current of battery module reaches the third predetermined value, so as to maintain the battery module to be charged with the second predetermined current via the constant current charging.

In an embodiment of the present invention, if the method of adjusting the power supplied to the battery module is to adjust a charging current thereof, the step e. of adjusting the power supplied to the battery module to maintain the battery module to be charged with the second predetermined voltage via the constant voltage charging then includes: e1. reducing the charging current supplied to the battery module by a level; e2. determining whether or not the voltage of the battery module reaches the second predetermined voltage; e3. reducing the charging current supplied to the battery module by the level again if the voltage in the battery module reaches the second predetermined voltage; e4. repeatedly performing the steps e2. and e3., so as to maintain the battery module to be charged with the second predetermined voltage via the constant voltage charging.

In an embodiment of the present invention, if the method of adjusting the power supplied to the battery module is to adjust a charging voltage thereof, the step e. of adjusting the power supplied to the battery module to maintain the battery module to be charged with the second predetermined voltage via the constant voltage charging then includes: e1. reducing the charging voltage supplied to the battery module by a level; e2. determining whether or not the voltage of the battery module reaches the second predetermined voltage; e3. reducing the charging voltage supplied to the battery module by the level again if the voltage of the battery module reaches the second predetermined voltage; e4. repeatedly performing the steps e2. and e3., so as to maintain the battery module to be charged with the second predetermined voltage via the constant voltage charging.

In an embodiment of the present invention, the first predetermined voltage and the second predetermined voltage are a maximum voltage that the battery module may bear for safe operation. In another embodiment, the first predetermined voltage equals to the maximum voltage that the battery module may bear for safe operation minus a voltage difference value, and the second predetermined voltage equals to the maximum voltage that the battery module may bear for safe operation.

In an embodiment of the present invention, the method of determining whether or not the battery module is fulfilled includes determining whether or not current flowing through the battery module is less than a minimum current, if yes, the battery module is then determined to be fulfilled; if not, the battery module is then determined to be not fulfilled.

In the present invention, by voltage control or current control, a constant current charging is applied for charging the battery module in an initial charging stage, and when the voltage of one of the parallely-connected battery cell sets reaches the safety value or the overall voltage of the battery module itself reaches a rated voltage thereof, the constant voltage charging is applied and the charging current is greatly reduced, so as to avoid a safety problem of the battery and prolong the lifespan of the battery.

In order to make the aforementioned and other objects, features and advantages of the present invention comprehensible, a preferred embodiment accompanied with figures is described in detail below.

DESCRIPTION OF EMBODIMENTS

Apparatus with relatively high power consumption, such as a notebook computer, generally requires a battery module consisted of a plurality of parallely-connected battery cell sets to obtain sufficient power for operation. However, since such battery module includes the plurality of parallely-connected battery cell sets, the volumes and charge/discharge states of these parallely-connected battery cell sets may be changed after long time utilization. Therefore, the states of the parallely-connected battery cell sets can not be guaranteed to be the same, and the charge or discharging performed thereon according to initial settings is no longer suitable.

Accordingly, to prevent the battery module from over charging, a smart battery module is developed, which may supervise the voltage of each parallely-connected battery cell set in the battery module, so as to adjust charging current or charging voltage supplied to the battery module. The present invention provides a method for charging the battery module in multiple stages, in which the smart battery module is applied, and factors of safety and charging efficiency etc. are all taken into consideration. To further convey the spirit of the present invention, embodiments of the present invention are provided below.

The First Embodiment

When the voltage of the battery module is closed to its rated voltage, chargeable places (hole) thereof are greatly reduced, and now if the battery module is still charged with a high current continuously, safety of the battery module cannot be ensured. Accordingly, in an embodiment of the present invention, when the voltage of one of the parallely-connected battery cell sets in the battery module reaches a maximum voltage that the battery module may bear for safe operation, the charging current supplied to the parallely-connected battery cell set is reduced by a certain level, so as to maintain the safety of the battery module.

Figure 1:
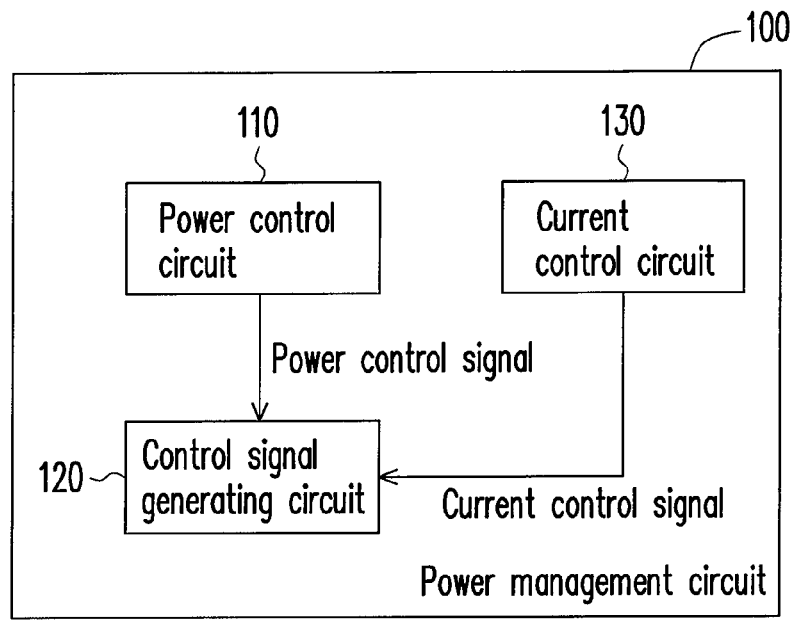
FIG. 1 is a block diagram of a conventional power management circuit.
Figure 2:
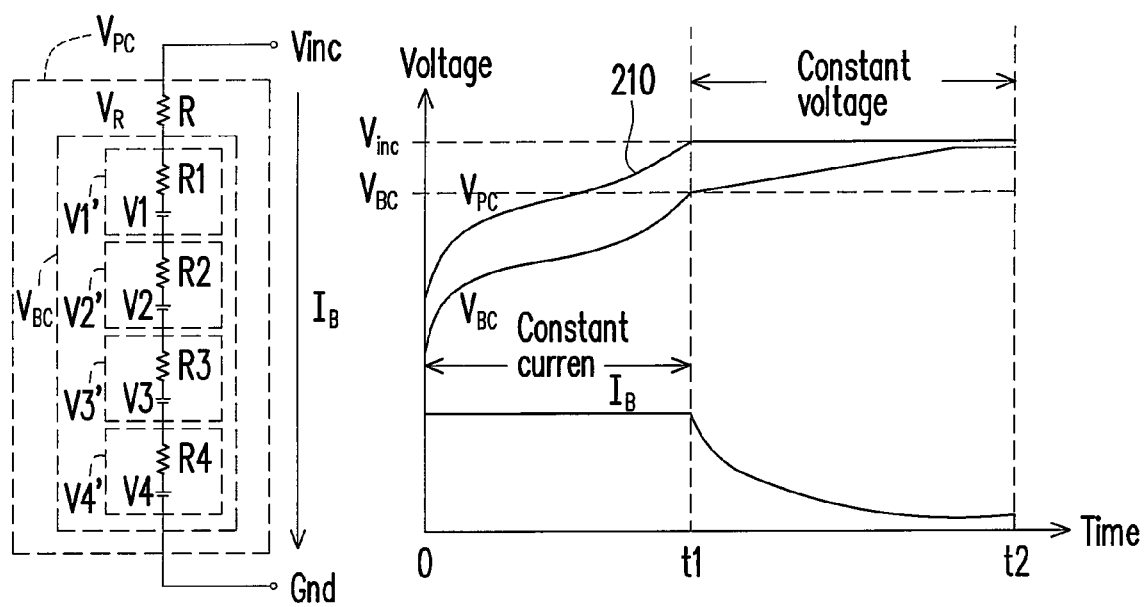
FIG. 2 is a schematic diagram illustrating a charging state of a conventional battery.
Figure 3:
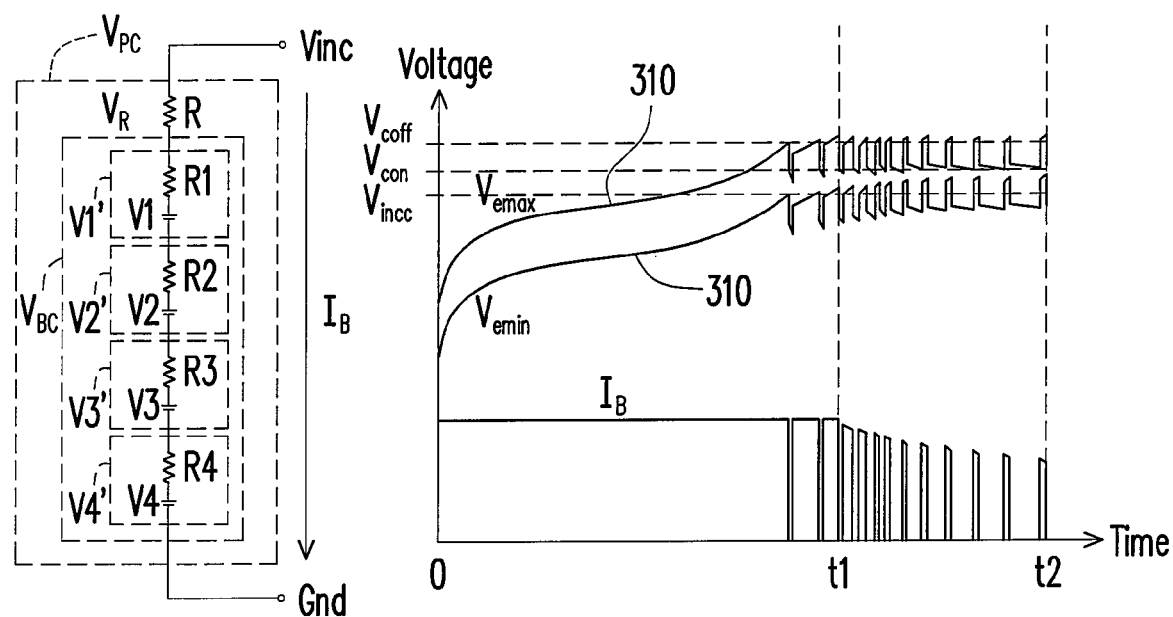
FIG. 3 is a schematic diagram illustrating a charging state of a conventional battery.
Figure 4:
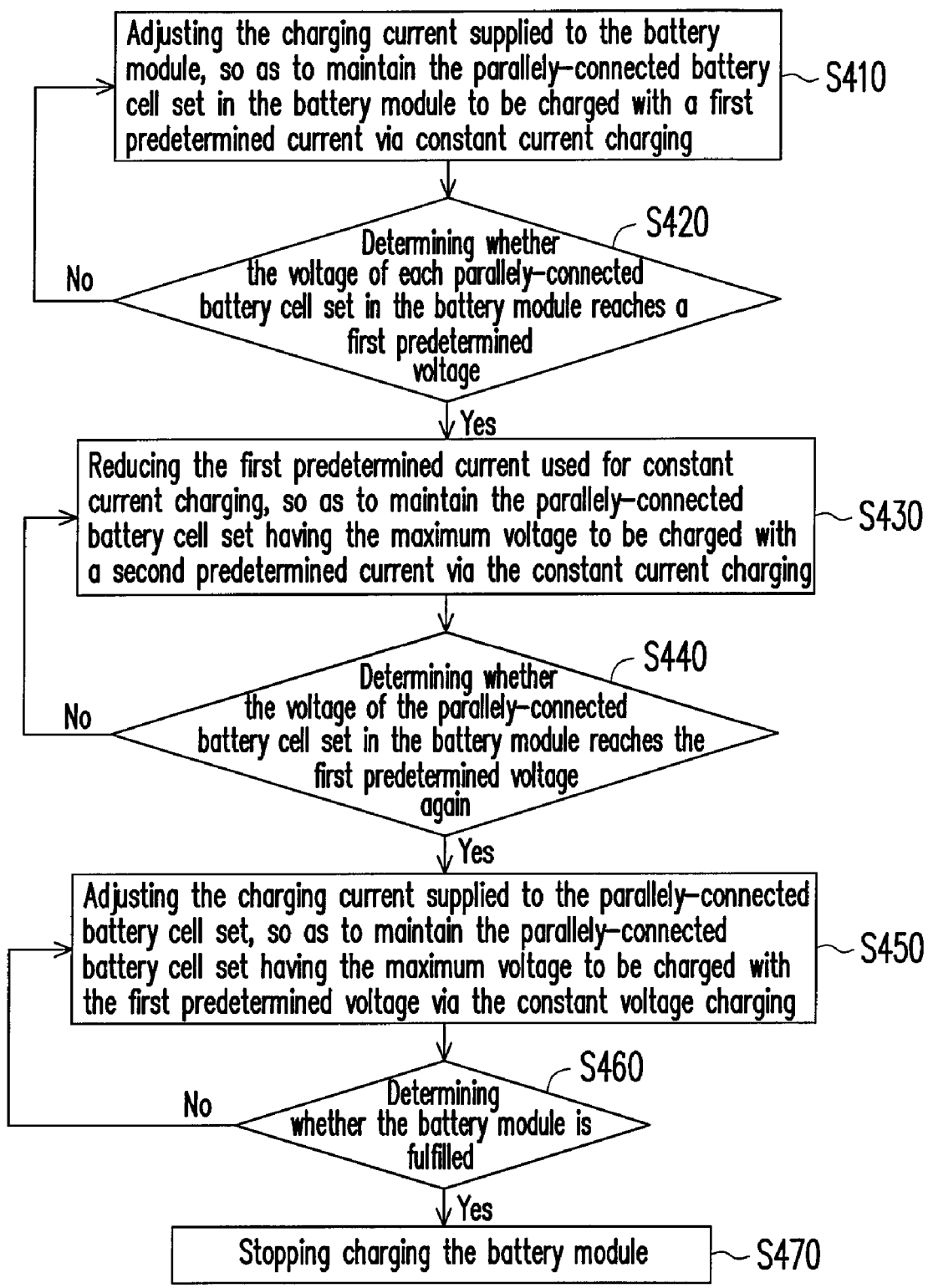
FIG. 4 is a flowchart illustrating a method for charging a battery module in multiple stages according to a first embodiment of the present invention.

FIG. 4 is a flowchart illustrating a method for charging a battery module in multiple stages according to a first embodiment of the present invention. Referring to FIG. 4, in the present embodiment, a battery module including a plurality of parallely-connected battery cell sets is charged through controlling the charging current, wherein each parallely-connected battery cell set may include one or more battery cells connected in parallel for providing sufficient power.

Figure 5:
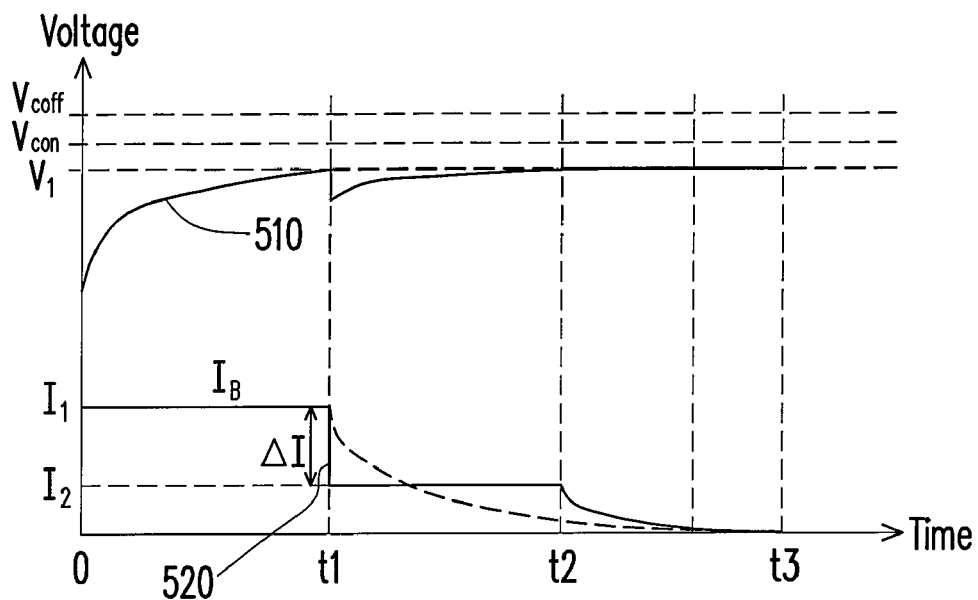
FIG. 5 is a diagram illustrating a charging curve of a battery module according to a first embodiment of the present invention.

FIG. 5 is a diagram illustrating a charging curve of a battery module according to a first embodiment of the present invention. Referring to FIG. 4 and FIG. 5, in a first charging stage ($t=0 \sim t_1$), the charging current supplied to the battery module is adjusted for maintaining the parallely-connected battery cell set to be charged with a first predetermined current $I_1$ via constant current charging (step S410). The first predetermined current $I_1$ may be a fixed current provided by a charger, and voltage of the charger is generally fixed, too. The voltage of each parallely-connected battery cell set in the battery module may be varied with increasing of received current, and gradually forms a voltage curve 510 of FIG. 5 varied along with time. The voltage curve 510 is a voltage curve of a parallely-connected battery cell set having a maximum voltage $V_{emax}$ in the battery module.

Next, whether or not the voltage of any parallely-connected battery cell set in the battery module reaches a first predetermined voltage $V_1$ is determined (step S420). The first predetermined voltage $V_1$ represents a maximum voltage (i.e. a rated voltage of the parallely-connected battery cell set) that a certain parallely-connected battery cell set may bear for safe operation, and is used for limiting the voltage of an individual parallely-connected battery cell set. In the present embodiment, the voltage of the parallely-connected battery cell set is limited within the first predetermined voltage $V_1$, so that the battery module may be charged while the safety of each parallely-connected battery cell set therein is guaranteed.

Back to the step S420, if the voltage of any parallely-connected battery cell set reaches the first predetermined voltage $V_1$, it represents the charging voltage supplied to the parallely-connected battery cell set reaches the maximum voltage that the parallely-connected battery cell set may bear. Now, to ensure the safety of the parallely-connected battery cell set, a second charging stage ($t=t_1 \sim t_2$) of the present embodiment is then started, in which the first predetermined current $I_1$ used for constant current charging is decreased, so as to maintain the parallely-connected battery cell set having the maximum voltage to be charged with a second predetermined current $I_2$ via the constant current charging (step S430), wherein the second predetermined current $I_2$ equals to the first predetermined current $I_1$ minus a current difference value $\Delta I$ (shown as a current curve 520 of FIG. 5). The current difference value $\Delta I$ may be 20%~50% of the first predetermined current $I_1$ used for constant current charging, which is not strictly limited.

To ensure the voltage of each parallely-connected battery cell set in the battery module does not exceed the rated voltage, in the present embodiment, the charging current supplied to the battery module is adjusted, so as to maintain the parallely-connected battery cell set having the maximum voltage to be charged by the constant current charging.

It should be noted that while maintaining the parallely-connected battery cell set to be charged with the second predetermined current $I_2$ via the constant current charging, whether or not the voltage of the parallely-connected battery cell set reaches the first predetermined voltage $V_1$ again is further determined (step S440). As described above, the first predetermined voltage $V_1$ is the maximum voltage that the parallely-connected battery cell set may bear for safe operation. When the voltage of the parallely-connected battery cell set reaches the first predetermined voltage $V_1$ again, it represents the parallely-connected battery cell set is approximately fulfilled, and now a third charging stage ($t=t_2 \sim t_3$) of the present embodiment is started, by which the charging current supplied to the parallely-connected battery cell set is adjusted, so as to maintain the parallely-connected battery cell set having the maximum voltage to be charged with the first predetermined voltage $V_1$ via the constant voltage charging (step S450).

Finally, whether or not the battery module is fulfilled is determined (step S460). The method of determining whether or not the battery module is fulfilled includes determining whether or not current flowing through the battery module is less than a minimum current value, and if yes, it represents the battery module is approximately fulfilled, and therefore the required current may be gradually decreased as the same voltage is supplied, and now the battery module may be determined to be fulfilled, and the charging of the battery module is then stopped (step S470); on the other hand, if the current flowing through the battery module is still greater than the minimum current, it represents the battery module is still not fulfilled, and the step S450 is repeated for continuously charging the parallely-connected battery cell set by the constant voltage charging until the battery module is fulfilled.

Figure 6:
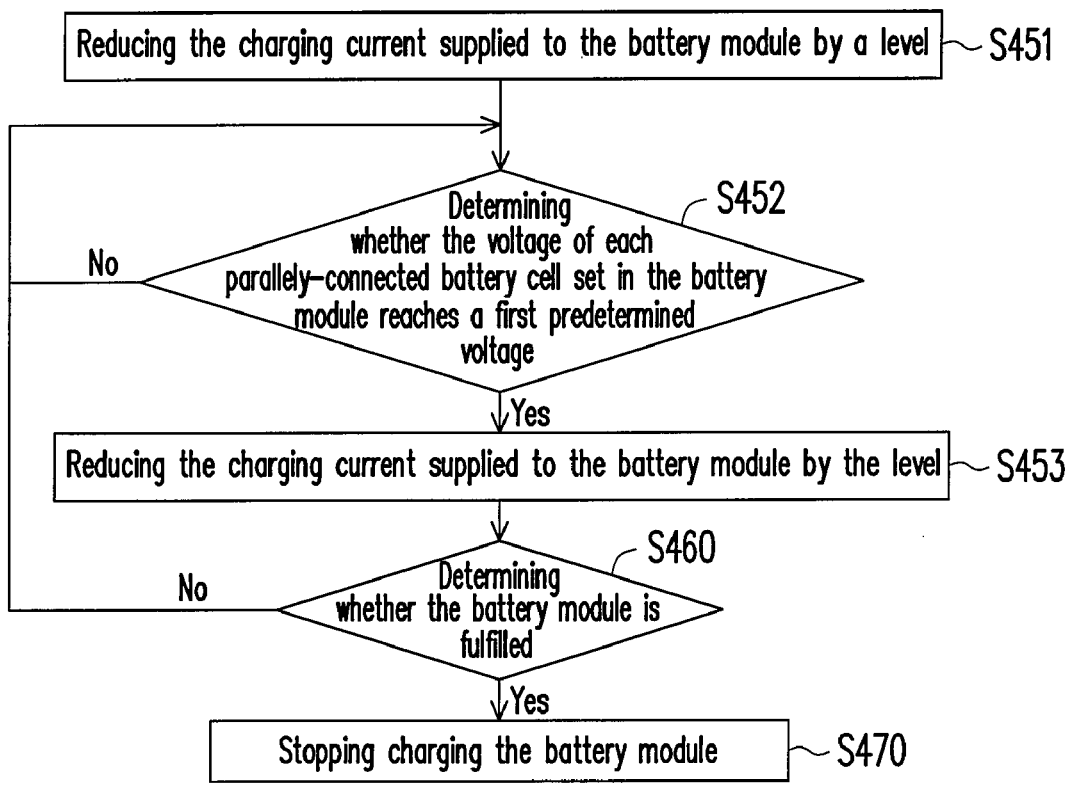
FIG. 6 is a flowchart illustrating a method for adjusting charging current to maintain a constant voltage charging according to a first embodiment of the present invention.

Moreover, another embodiment is provided for describing how to adjust the charging current for maintaining the parallely-connected battery cell set to be charged by the constant voltage charging in the step S450. FIG. 6 is a flowchart illustrating a method for adjusting charging current to maintain a constant voltage charging according to a first embodiment of the present invention. Referring to FIG. 6, after the step S450, the charging current is adjusted based on the rated voltage of the parallely-connected battery cell set for maintaining the parallely-connected battery cell set to be charged by the constant voltage charging.

In the present embodiment, an initial situation is that the voltage of a certain parallely-connected battery cell set reaches the rated voltage. To prevent the voltage of the parallely-connected battery cell set from exceeding the rated voltage, the charging current supplied to the battery module is reduced by a level (step S451). Such level is determined according to an actual requirement defined by different charger manufacturers, which is not limited by the present invention. Moreover, after the charging current is reduced, the charging voltage remains unchanged, though the voltage of the battery module is slightly decreased along with the decreasing of the received charging current, and the decreasing range of the voltage is influenced by the decreasing range of the charging current. To maintain a fixed charging voltage, the decreasing range of the level of the charging current is relatively small, so as to maintain a charging voltage curve of FIG. 5 to be horizontal.

After the level of the charging voltage is decreased, the voltage of the parallely-connected battery cell set drops slightly, and therefore whether or not the voltage of any parallely-connected battery cell set in the battery module reaches the rated voltage is determined again (step S452), and if yes, the charging current is reduced by the level again (step S453). Finally, whether or not the battery module is fulfilled is then determined (S460), if yes, charging in the battery module is stopped (step S470); and if not, the aforementioned steps of level decrement and voltage judgement are repeated until the battery module is fulfilled.

Through the control of the charging current as described above, a constant current charging is applied in the initial charging stage. When the voltage of a certain parallely-connected battery cell set reaches the rated voltage, the charging current is greatly reduced, and when the voltage of the parallely-connected battery cell set again reaches the rated voltage, a constant voltage charging is then applied. Therefore, the safety problem of the battery module in the prior art is avoided, and lifespan of the battery module is prolonged.

It should be noted that before the step of adjusting the charging current supplied to the battery module for maintaining the parallely-connected battery cell set to be charged by the constant current charging, the method of the present embodiment further includes following steps. First, a trickle charging is applied to the battery module. Next, whether or not the voltage of the battery module reaches a charging starting voltage is determined. If yes, the constant current charging is then applied to the battery module. The reason of applying such steps is that when applying a high current to charging an over discharged or deep discharged battery, it is relatively difficult to restore a full volume of the battery, and therefore when the power of the battery is extremely low, the trickle charging has to be applied for protecting the battery.

The Second Embodiment

Besides the "current control" during charging the battery module as described above, the "voltage control" may also be applied for charging-the battery module, and an embodiment thereof is provided below.

Figure 7:
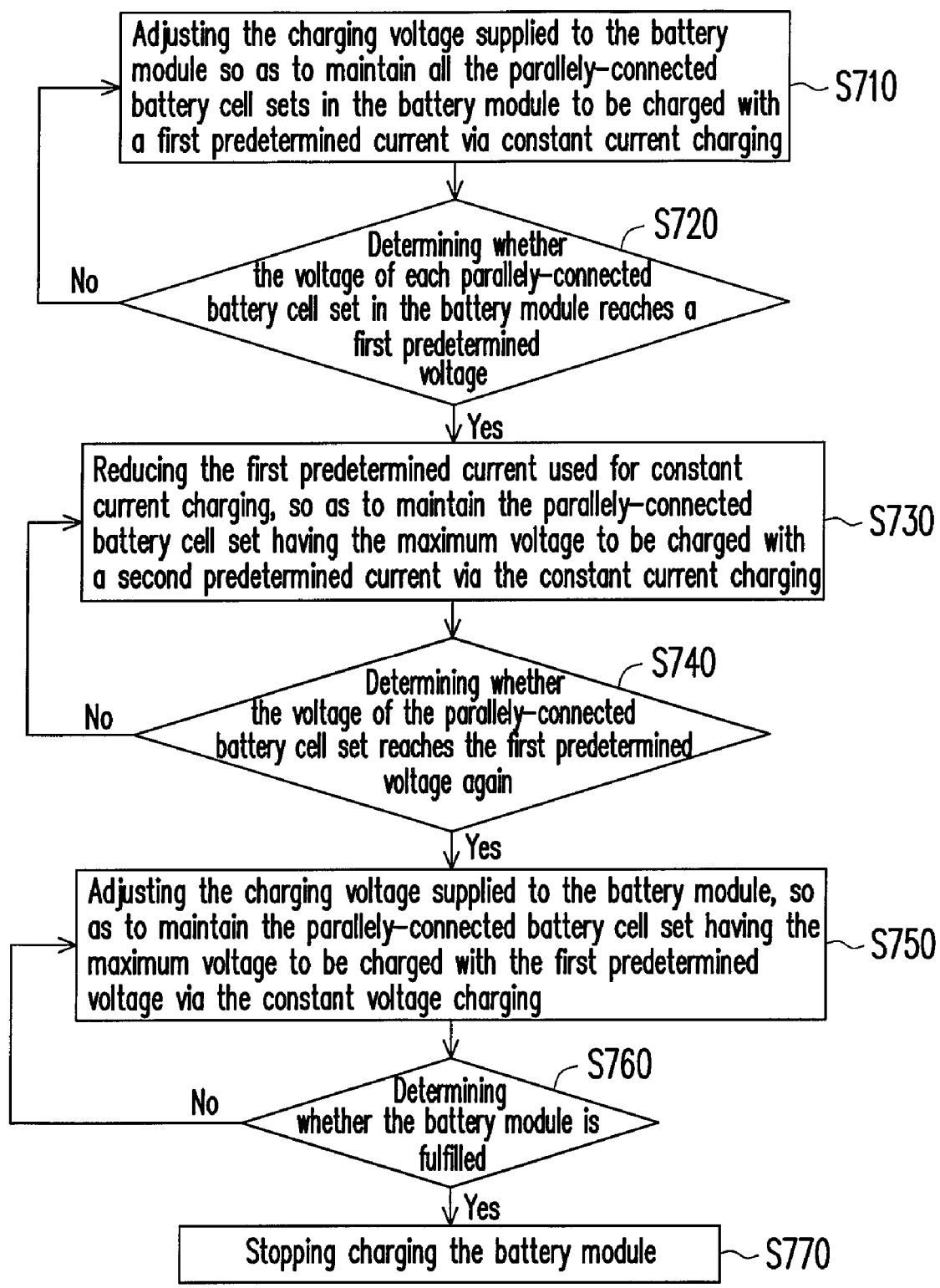
FIG. 7 is a flowchart illustrating a method for charging a battery module in multiple stages according to a second embodiment of the present invention.

FIG. 7 is a flowchart illustrating a method for charging a battery module in multiple stages according to a second embodiment of the present invention. Referring to FIG. 7, the battery module including the plurality of parallely-connected battery cell sets is charged through controlling the "charging voltage", and when the voltage of one of the parallely-connected battery cell sets in the battery module reaches a maximum voltage that the battery module may bear for safe operation, the charging current supplied to the parallely-connected battery cell set is reduced by a certain level, so as to maintain the safety of the battery.

Figure 8:
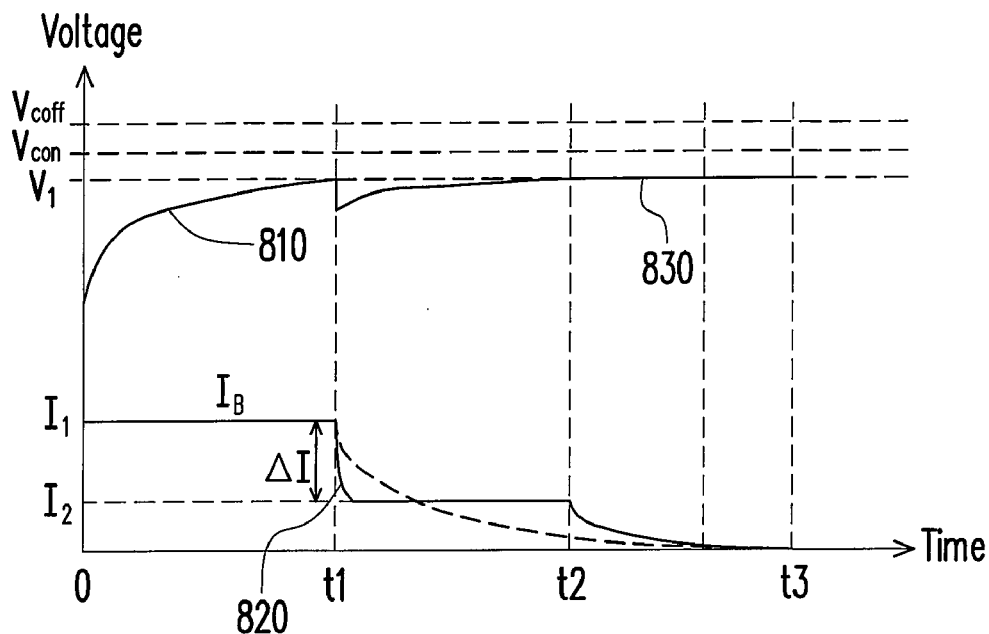
FIG. 8 is a diagram illustrating a charging curve of a battery module according to a second embodiment of the present invention.

FIG. 8 is a diagram illustrating a charging curve of a battery module according to a second embodiment of the present invention. Referring to FIG. 7 and FIG. 8, similar to the first embodiment, the charging method of the present embodiment also includes three charging stages. In a first charging stage ($t=0 \sim t_1$), the charging voltage supplied to the battery module is adjusted for maintaining all the parallely-connected battery cell sets in the battery module to be charged with a first predetermined current $I_1$ via constant current charging (step S710). Wherein, the charging voltage is provided by a charger, and the charging current is fixed. The voltage of the parallely-connected battery cell set is still varied along with the increasing of received current, and gradually forms a curve 810 of FIG. 8 varied along with time.

Next, whether or not the voltage of any parallely-connected battery cell set in the battery module reaches a first predetermined voltage $V_1$ is determined (step S720). Wherein, if the voltage of any parallely-connected battery cell set reaches the first predetermined voltage $V_1$, it represents the charging voltage supplied to the parallely-connected battery cell set reaches the maximum voltage that the parallely-connected battery cell set may bear. Now, to ensure the safety of the parallely-connected battery cell set, a second charging stage ($t=t_1 \sim t_2$) of the present embodiment is then started, in which the first predetermined current $I_1$ used for constant current charging is gradually decreased, so as to maintain the parallely-connected battery cell set having the maximum voltage to be charged with a second predetermined current $I_2$ via the constant current charging (step S730), wherein the second predetermined current $I_2$ equals to the first predetermined current $I_1$ minus a current difference value $\Delta I$, and the current difference value $\Delta I$ may be 20%~50% of the first predetermined current $I_1$ used for constant current charging, which is not strictly limited.

To ensure the voltage of each parallely-connected battery cell set in the battery module does not exceed the rated voltage, in the present embodiment, the charging voltage supplied to the battery module is adjusted, so as to maintain the parallely-connected battery cell set having the maximum voltage to be charged by a constant current charging.

Similarly, while maintaining the parallely-connected battery cell set to be charged with the second predetermined current $I_2$ via the constant current charging, whether or not the voltage of the parallely-connected battery cell set reaches the first predetermined voltage $V_1$ again is further determined (step S740). When the voltage of the parallely-connected battery cell set reaches the first predetermined voltage $V_1$ again, a third charging stage ($t=t_2 \sim t_3$) of the present embodiment is then started, in which the charging voltage supplied to the battery module is adjusted, so as to maintain the parallely-connected battery cell set having the maximum voltage to be charged with the first predetermined voltage $V_1$ via the constant voltage charging (step S750).

Finally, whether or not the battery module is fulfilled is determined (step S760). Wherein, if the current flowing through the battery module is gradually decreased to be less than a minimum current, the battery module then may be determined to be fulfilled, and the charging of the battery module is then stopped (step S770); on the other hand, if the current flowing through the battery module is still greater than the minimum current, it represents the battery module is still not fulfilled, and the step S750 is then repeated for continuously charging the battery module by the constant voltage charging until the battery module is fulfilled.

As described above, a main difference between the present embodiment and the first embodiment is that in the present embodiment, the charging current and charging voltage supplied to the battery module is controlled by adjusting the "charging voltage". Another embodiment is provided below for describing how to adjust the charging voltage for maintaining the battery module to be charged by the constant voltage charging.

Figure 9:
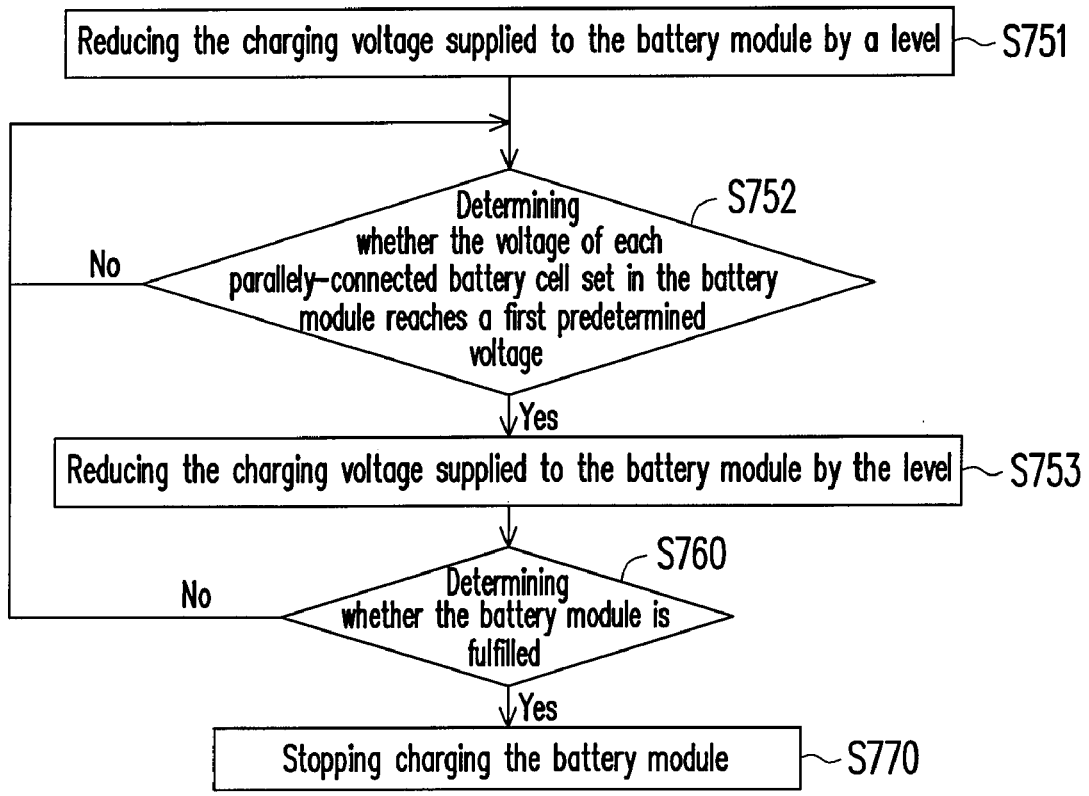
FIG. 9 is a flowchart illustrating a method for adjusting charging current to maintain a constant voltage charging according to a second embodiment of the present invention.

Referring to FIG. 9, after the step S750, the charging voltage is adjusted based on the rated voltage of the parallely-connected battery cell set for maintaining the parallely-connected battery cell set to be charged by the constant voltage charging.

In the present embodiment, an initial situation is that the voltage of a certain parallely-connected battery cell set reaches the rated voltage again. To prevent the voltage of the parallely-connected battery cell set from exceeding the rated voltage, the charging voltage supplied to the battery module is first reduced by a level (step S751). After the charging voltage is reduced, the charging current thereof remains unchanged, though the voltage of the parallely-connected battery cell set is slightly decreased along with the decreasing of the received charging voltage, and the decreasing range of the voltage is influenced by the decreasing range of the charging voltage. To maintain a fixed voltage of the parallely-connected battery cell set, the decreasing range of the level of the charging voltage is relatively small, so as to maintain a charging voltage curve 830 of FIG. 8 to be horizontal.

After the level of the charging voltage is decreased, the voltage of the parallely-connected battery cell set drops slightly, and therefore whether or not the voltage of any parallely-connected battery cell set in the battery module reaches the rated voltage is determined again (step S752), and if yes, the charging voltage is reduced by the level again (step S753). Finally, whether or not the battery module is fulfilled is then determined (S760), if yes, the charging of the battery module is stopped (step S770); and if not, the steps of reducing level of the charging voltage and determining voltage of the parallely-connected battery cell set are repeated until the battery module is fulfilled.

Through the control of the charging voltage as described above, a constant current charging is applied in the initial charging stage. When the voltage of a certain parallely-connected battery cell set reaches the rated voltage, the charging current is greatly reduced, and when the voltage of the parallely-connected battery cell set reaches the rated voltage again, a constant voltage charging is then applied. Therefore, the safety problem of the battery module in the prior art is avoided, and lifespan of the battery module is prolonged.

The Third Embodiment

In both two aforementioned embodiments, the charging current is greatly decreased for protecting the battery module when the voltage of the parallely-connected battery cell set reaches the rated voltage. Compared to the aforementioned embodiments, in the present embodiment, the time point for "greatly reducing the charging current" is delayed, namely, when the voltage of the parallely-connected battery cell set reaches the rated voltage, the parallely-connected battery cell set is first charged with the rated voltage via the constant voltage charging, until the charging voltage is gradually decreased to a certain low charging current, and then the charging current is greatly reduced to accelerate charging speed of the battery module.

Figure 10:
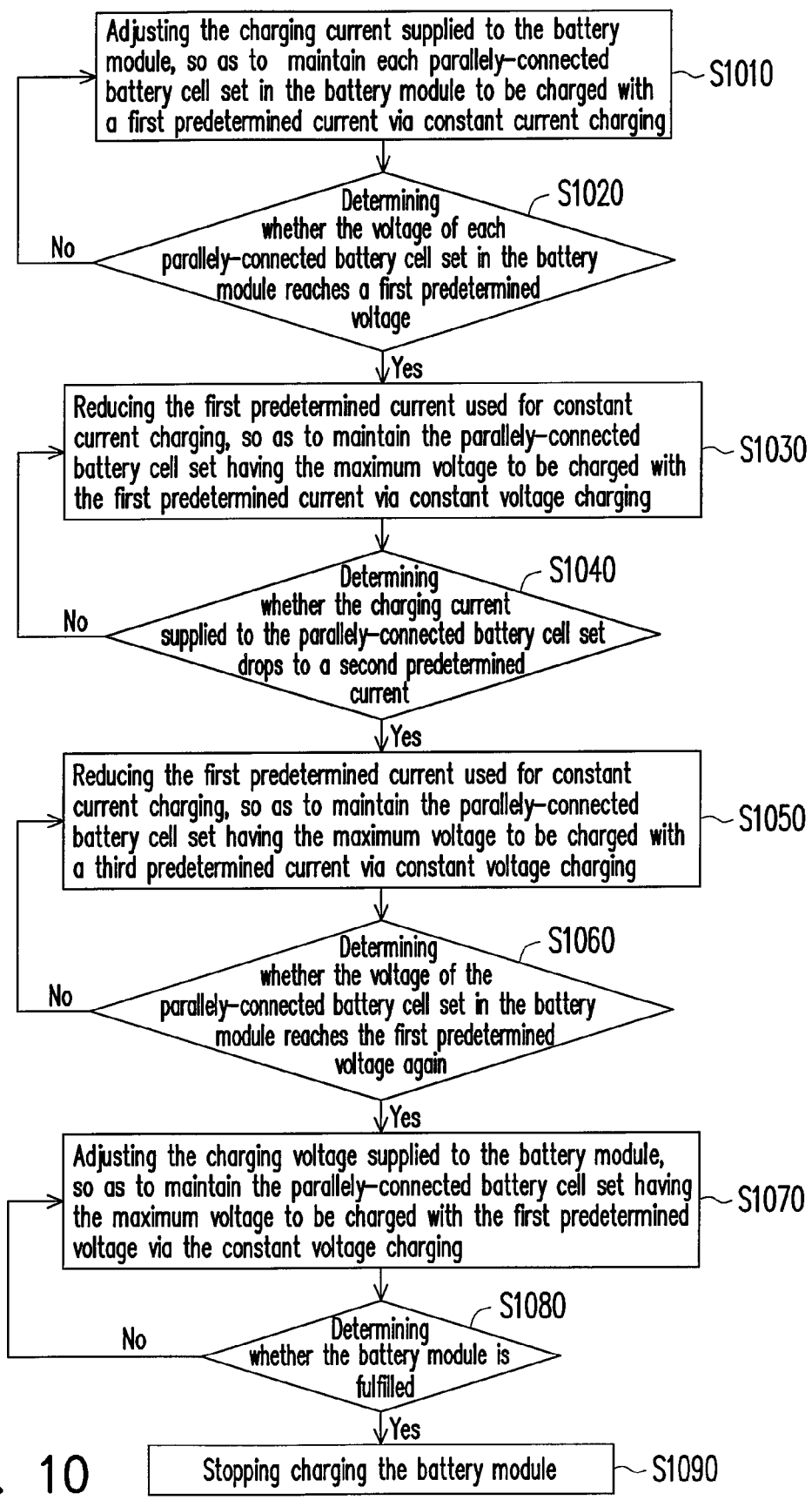
FIG. 10 is a flowchart illustrating a method for charging a battery module in multiple stages according to a third embodiment of the present invention.
Figure 11:
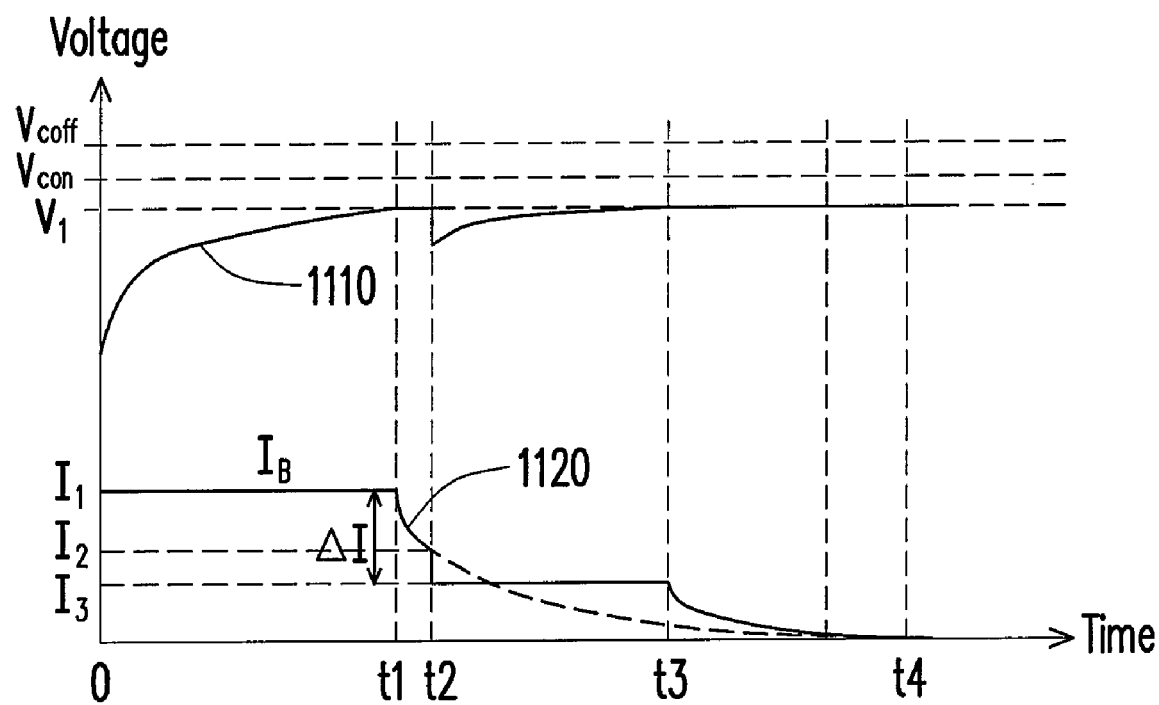
FIG. 11 is a diagram illustrating a charging curve of a battery module according to a third embodiment of the present invention.

FIG. 10 is a flowchart illustrating a method for charging a battery module in multiple stages according to a third embodiment of the present invention. FIG. 11 is a diagram illustrating a charging curve of a battery module according to a third embodiment of the present invention. Referring to FIG. 10 and FIG. 11, in the present embodiment, a battery module including a plurality of parallely-connected battery cell sets is charged through controlling the charring current. Different from the first embodiment, the present embodiment includes four charging stages. In a first charging stage ($t=0 \sim t_1$), the charging current supplied to the battery module is adjusted for maintaining the parallely-connected battery cell sets in the battery module to be charged with a first predetermined current $I_1$ via constant current charging (step S1010). The voltage of each parallely-connected battery cell set in the battery module may be varied with the increasing of the received current, and gradually forms a voltage curve 1110 of FIG. 11 varied along with time. The voltage curve 1110 is a voltage curve of a parallely-connected battery cell set having a maximum voltage $V_{emax}$ in the battery module.

Next, whether or not the voltage of any parallely-connected battery cell set in the battery module reaches a first predetermined voltage $V_1$ is determined (step S1020). Wherein, if the voltage of any parallely-connected battery cell set reaches the first predetermined voltage $V_1$, it represents the charging voltage supplied to the parallely-connected battery cell set reaches the maximum voltage that the parallely-connected battery cell set may bear. Now, to ensure the safety of the parallely-connected battery cell set, a second charging stage ($t=t_1 \sim t_2$) of the present embodiment is then started, in which the first predetermined current $I_1$ used for constant current charging is gradually decreased, so as to maintain the parallely-connected battery cell set having the maximum voltage to be charged with the first predetermined current $I_1$ via constant voltage charging (step S1030).

During, the constant voltage charging, since the battery module is gradually charged to be full, the charging current supplied to the battery module drops gradually. Now, to ensure the safety of the parallely-connected battery cell set, whether or not the charging current supplied to the parallely-connected battery cell set drops to a second predetermined current $I_2$ is determined (step S1040). When the charging current supplied to the parallely-connected battery cell set drops to the second predetermined current $I_2$, a third charging stage ($t=t_2 \sim t_3$) of the present embodiment is then started, in which the parallely-connected battery cell set having the maximum voltage originally maintained to be charged with the first predetermined voltage $V_1$ via the constant voltage charging is now changed to be charged with a third predetermined current $I_3$ via the constant current charging (step S1050). Similar to the second predetermined current $I_2$ of the first embodiment, the third predetermined current $I_3$ equals to the first predetermined current $I_1$ minus a current difference value $\Delta I$, and the current difference value $\Delta I$ may be 20%~50% of the first predetermined current $I_1$ used for constant current charging, which is not strictly limited.

It should be noted that while maintaining the parallely-connected battery cell set to be charged with the third predetermined current $I_3$ via the constant current charging, whether or not the voltage of the parallely-connected battery cell set in the battery module reaches the first predetermined voltage $V_1$ again is further determined (step S1060). When the voltage of the parallely-connected battery cell set reaches the first predetermined voltage $V_1$ again, it represents the parallely-connected battery cell set is approximately fulfilled, and a fourth charging stage ($t=t_3 \sim t_4$) of the present embodiment is then started, in which the charging voltage supplied to the battery module is adjusted, so as to maintain the parallely-connected battery cell set having the maximum voltage to be charged with the first predetermined voltage $V_1$ via the constant voltage charging (step S1070).

Finally, whether or not the battery module is fulfilled is determined (step S1080). The method of determining whether or not the battery module is fulfilled includes determining whether or not current flowing through the battery module is less than a minimum current value, and if yes, it represents the battery module is approximately fulfilled, and therefore the required current may be gradually decreased as the same voltage is supplied, and now the battery module may be determined to be fulfilled, and charging in the battery module is then stopped (step S1090); on the other hand, if the current flowing through the battery module is still greater than the minimum current, it represents the battery module is still not fulfilled, and the step S1070 is repeated for continuously charging the parallely-connected battery cell set by the constant voltage charging until the battery module is fulfilled.

Based on the charging method of the present embodiment, by delaying the operation of "greatly reducing the charging current" compared to the first and the second embodiments, each parallely-connected battery cell set in the battery module may be charged with sufficient power, and the charging speed thereof is improved.

The Fourth Embodiment

Compared to the third embodiment which delays the time point for "greatly reducing the charging current", in the present embodiment, the time point for "greatly reducing the charging current" is moved forward, namely, the rated voltage used for determining whether to reduce the charging current is reduced, so as to reduce the charging current as early as possible for protecting the battery module.

Figure 12:
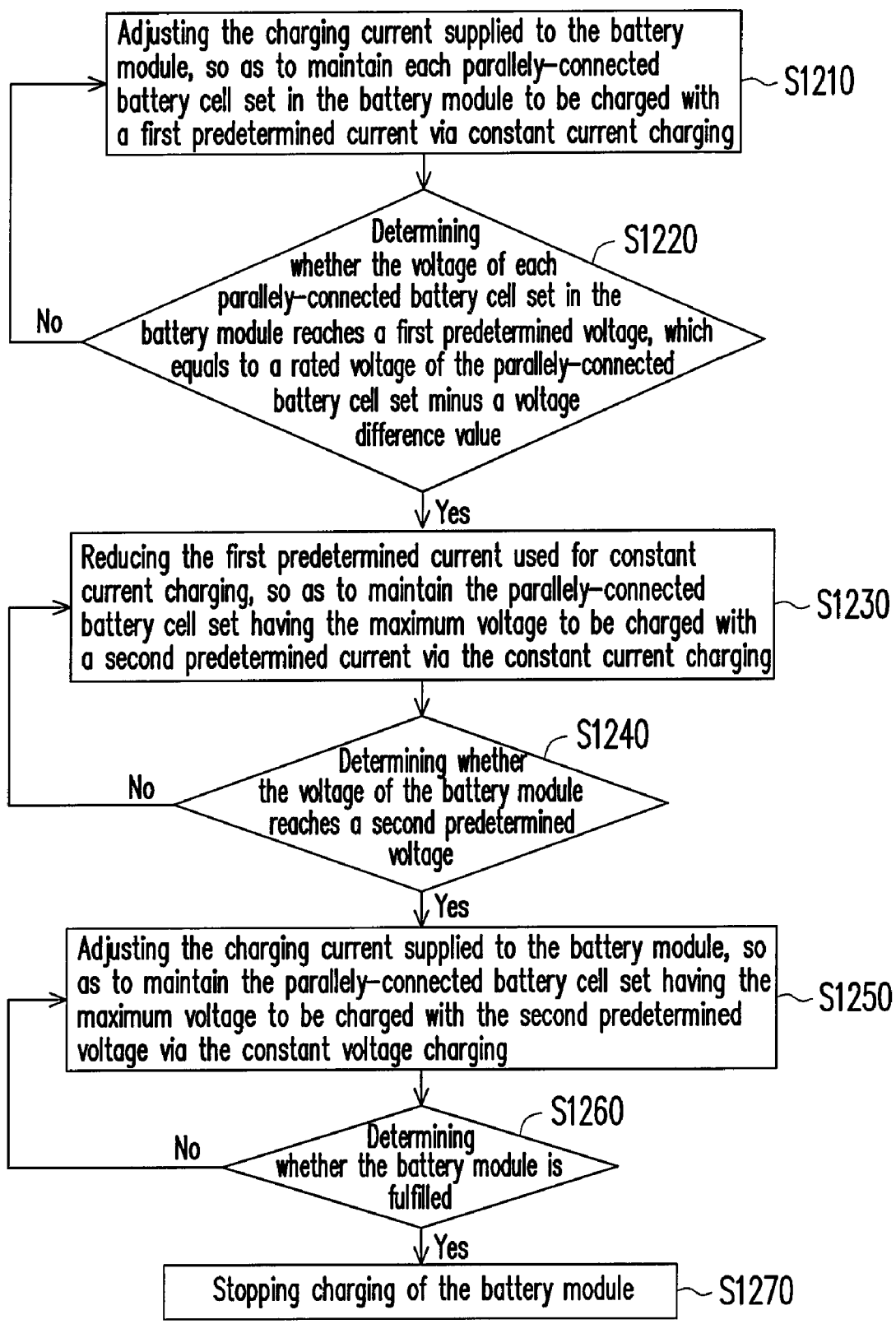
FIG. 12 is a flowchart illustrating a method for charging a battery module in multiple stages according to a fourth embodiment of the present invention.
Figure 13:
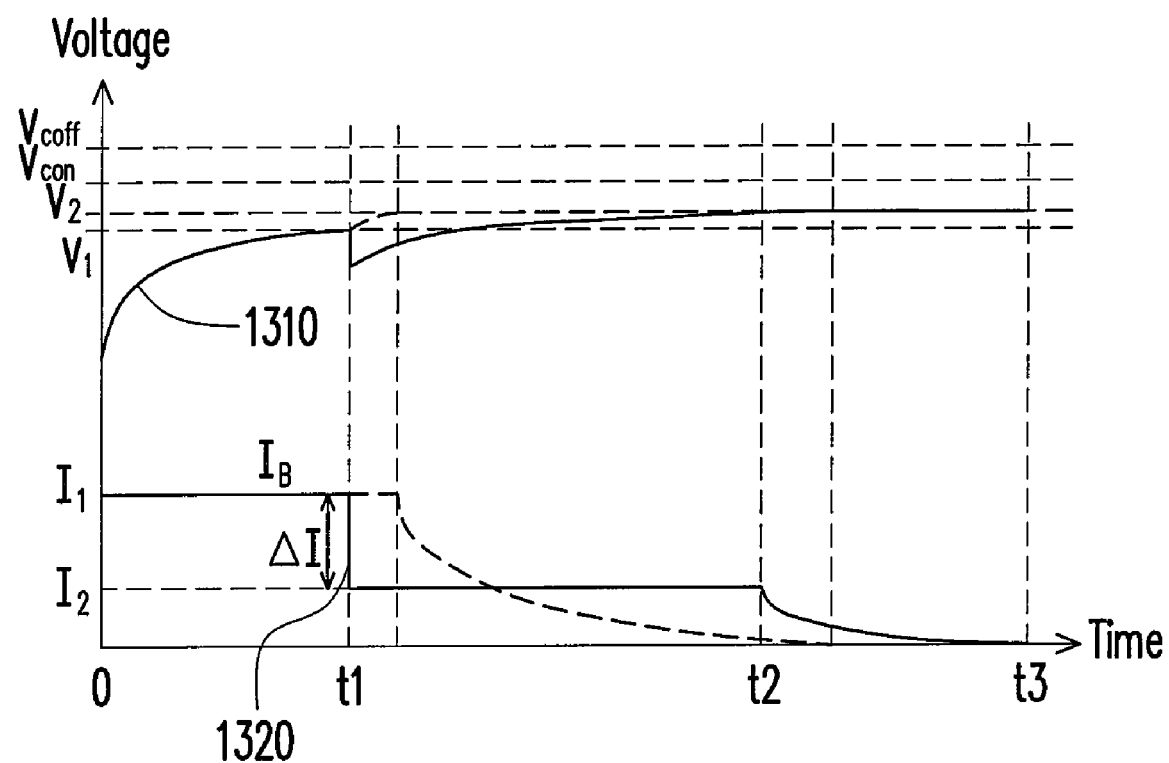
FIG. 13 is a diagram illustrating a charging curve of a battery module according to a fourth embodiment of the present invention.

FIG. 12 is a flowchart illustrating a method for charging a battery module in multiple stages according to a fourth embodiment of the present invention. FIG. 13 is a diagram illustrating a charging curve of a battery module according to a fourth embodiment of the present invention. Referring to FIG. 12 and FIG. 13, in the present embodiment, a battery module including a plurality of parallely-connected battery cell sets is charged through controlling the charring current. The present embodiment includes three charging stages. In a first charging stage ($t=0 \sim t_1$), the charging current supplied to the battery module is adjusted for maintaining the parallely-connected battery cell sets in the battery module to be charged with a first predetermined current $I_1$ via constant current charging (step S1210). The voltage of each parallely-connected battery cell set in the battery module may be varied with the increasing of the received-current, and gradually forms a voltage curve 1310 of FIG. 13 varied along with time. The voltage curve 1310 is a voltage curve of a parallely-connected battery cell set having a maximum voltage $V_{emax}$ in the battery module.

Next, whether or not the voltage of any parallely-connected battery cell set in the battery module reaches a first predetermined voltage $V_1$ is determined (step S1220). It should be noted that the difference between the present embodiment and the third embodiment is that the first predetermined voltage $V_1$ is set to be a maximum voltage (i.e. a rated voltage of the parallely-connected battery cell set, for example a voltage $V_2$ shown in FIG. 13) that a certain parallely-connected battery cell set may bear for safe operation minus a voltage difference value $\Delta V$, so as to reduce the charging voltage as early as possible for protecting the battery module.

Back to the step S1220, if the voltage of any parallely-connected battery cell set reaches the first predetermined voltage $V_1$, it represents the charging voltage supplied to the parallely-connected battery cell set reaches the maximum voltage that the parallely-connected battery cell set may bear. Now, to ensure the safety of the parallely-connected battery cell set, a second charging stage ($t=t_1 \sim t_2$) of the present embodiment is then started, in which the first predetermined current $I_1$ used for constant current charging is decreased, so as to maintain the parallely-connected battery cell set having the maximum voltage to be charged with a second predetermined current $I_2$ via the constant current charging (step S1230), wherein the second predetermined current $I_2$ equals to the first predetermined current $I_1$ minus a current difference value $\Delta I$, and the current difference value $\Delta I$ may be 20%~50% of the first predetermined current $I_1$ used for constant current charging, which is not strictly limited.

It should be noted that while maintaining the parallely-connected battery cell set to be charged with the second predetermined current $I_2$ via the constant current charging, whether or not the voltage of the parallely-connected battery cell set reaches a second predetermined voltage $V_2$ again is further determined (step S1240). The second predetermined voltage $V_2$ is a maximum voltage (i.e. the rated voltage of the parallely-connected battery cell set) that the parallely-connected battery cell set may bear for safe operation. When the voltage of the parallely-connected battery cell set reaches the second predetermined voltage $V_2$ again, it represents the parallely-connected battery cell set is approximately fulfilled, and now a third charging stage ($t=t_2 \sim t_3$) of the present embodiment is started, in which the charging current supplied to the battery module is adjusted, so as to maintain the parallely-connected battery cell set having the maximum voltage to be charged with the second predetermined voltage $V_2$ via the constant voltage charging (step S1250).

Finally, whether or not the battery module is fulfilled is determined (step S1260). The method of determining whether or not the battery module is fulfilled includes determining whether or not the current flowing through the battery module is less than a minimum current value, and if yes, it represents the battery module is approximately fulfilled, and therefore the required current may be gradually decreased as the same voltage is supplied, and now the battery module may be determined to be fulfilled, and the charging of the battery module is then stopped (step S1270); on the other hand, if the current flowing through the battery module is still greater than the minimum current, it represents the battery module is still not fulfilled, and the step S1250 is repeated for continuously charging the parallely-connected battery cell set by the constant voltage charging until the battery module is fulfilled.

According to the battery module charging method of the present embodiment, the time point for "greatly reducing the charging current" is moved forward compared to the first and the second embodiments, and therefore the reduction of lifespan of the parallely-connected battery cell sets in the battery module due to over charging is avoided, and the safety of the battery module is ensured. The use of the aforementioned four embodiments may be selected according to an actual requirement, which is not limited by the present invention.

The Fifth Embodiment

In the aforementioned four embodiments, the "voltage of the parallely-connected battery cell set" is taken as a judgement condition for greatly reducing the charging current. However, the "voltage of the whole battery module" may also be taken as the judgement condition for "greatly reducing the charging current". The present embodiment corresponds to the first embodiment, by which when the voltage of the battery module reaches the rated voltage, the charging current thereof is greatly reduced for protecting the battery module.

Figure 14:
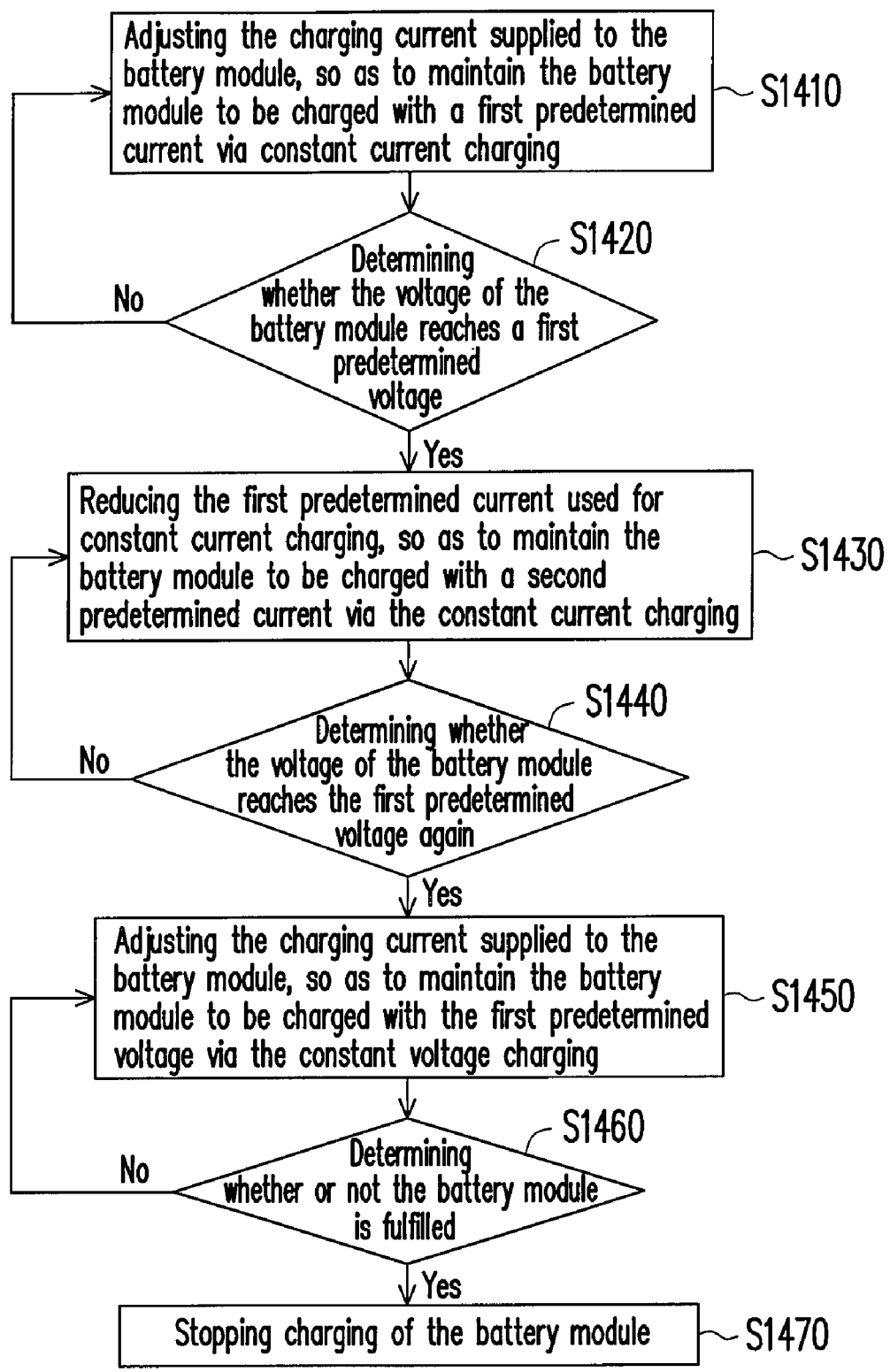
FIG. 14 is a flowchart illustrating a method for charging a battery module in multiple stages according to a fifth embodiment of the present invention.
Figure 15:
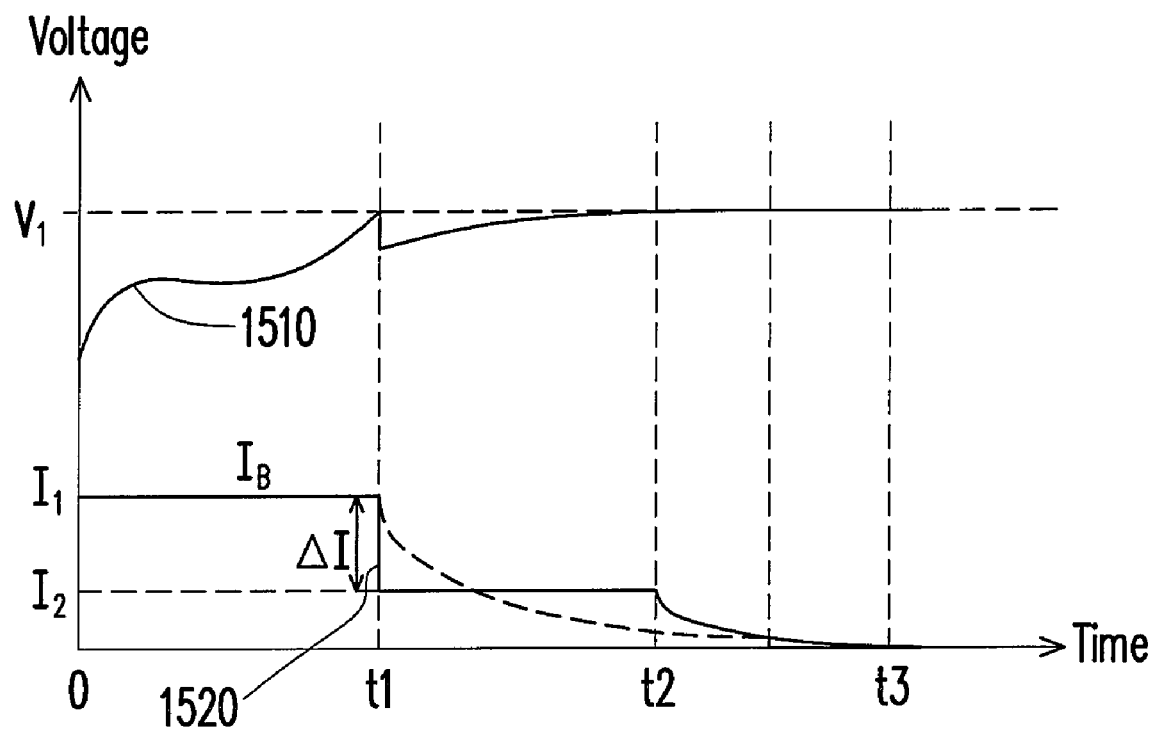
FIG. 15 is a diagram illustrating a charging curve of a battery module according to a fifth embodiment of the present invention.

FIG. 14 is a flowchart illustrating a method for charging a battery module in multiple stages according to a fifth embodiment of the present invention. FIG. 15 is a diagram illustrating a charging curve of a battery module according to a fifth embodiment of the present invention. In the present embodiment, a battery module is charged through controlling the charring current. The present embodiment includes three charging stages. In a first charging stage ($t=0\sim t_1$), the charging current supplied to the battery module is adjusted for maintaining the battery module to be charged with a first predetermined current $I_1$ via constant current charging (step S1410). The voltage of the whole battery module may be varied with the increasing of the received current, and gradually forms a voltage curve 1510 of FIG. 15 varied along with time.

Next, whether or not the voltage of the battery module reaches a first predetermined voltage $V_1$ is determined (step S1420). The first predetermined voltage $V_1$ represents a maximum voltage (i.e. a rated voltage of the battery module) that the battery module may bear for safe operation. In the present embodiment, the voltage of the battery module is limited within the first predetermined voltage $V_1$, so as to charge the battery module while guaranteeing the safety of the battery module.

Back to the step S1420, if the voltage of the battery module reaches the first predetermined voltage $V_1$, it represents the charging voltage supplied to the battery module reaches the maximum voltage that the battery module may bear. Now, to ensure the safety of the battery module, a second charging stage ($t=t_1\sim t_2$) of the present embodiment is then started, in which the first predetermined current $I_1$ used for constant current charging is decreased, so as to maintain the battery module to be charged with a second predetermined current $I_2$ via the constant current charging (step S1430), wherein the second predetermined current $I_2$ equals to the first predetermined current $I_1$ minus a current difference value $\Delta I$ (shown as a current curve 1520 of FIG. 15), and the current difference value $\Delta I$ may be 20%~50% of the first predetermined current $I_1$ used for constant current charging, which is not strictly limited.

It should be noted that while maintaining the battery module to be charged with the second predetermined current $I_2$ via the constant current charging, whether or not the voltage of the battery module reaches the first predetermined voltage $V_1$ again is further determined (step S1440). As described above, the first predetermined voltage $V_1$ is the maximum voltage that the battery module may bear for safe operation. When the voltage of the battery module reaches the first predetermined voltage $V_1$ again, it represents the battery module is approximately fulfilled, and now a third charging stage ($t=t_2\sim t_3$) of the present embodiment is started, in which the charging current supplied to the battery module is adjusted, so as to maintain the battery module to be charged with the first predetermined voltage $V_1$ via the constant voltage charging (step S1450).

Finally, whether or not the battery module is fulfilled is determined (step S1460). When the battery module is determined to be fulfilled, the charging of the battery module is then stopped (step S1470); on the other hand, if the battery module is still not fulfilled, the step S1450 is repeated for continuously charging the battery module by the constant voltage charging until the battery module is fulfilled.

The Sixth Embodiment

In the aforementioned five embodiments, the charging current is greatly decreased for protecting the battery module when the voltage of the battery module reaches the rated voltage. Compared to the aforementioned embodiments, in the present embodiment, the time point for "greatly reducing the charging current" is delayed, namely, when the voltage of the battery module reaches the rated voltage, the battery module is first charged with the rated voltage via the constant voltage charging until the charging voltage is gradually decreased to a certain low charging current, and then the charging current is greatly reduced to accelerate the charging speed of the battery module.

Figure 16:
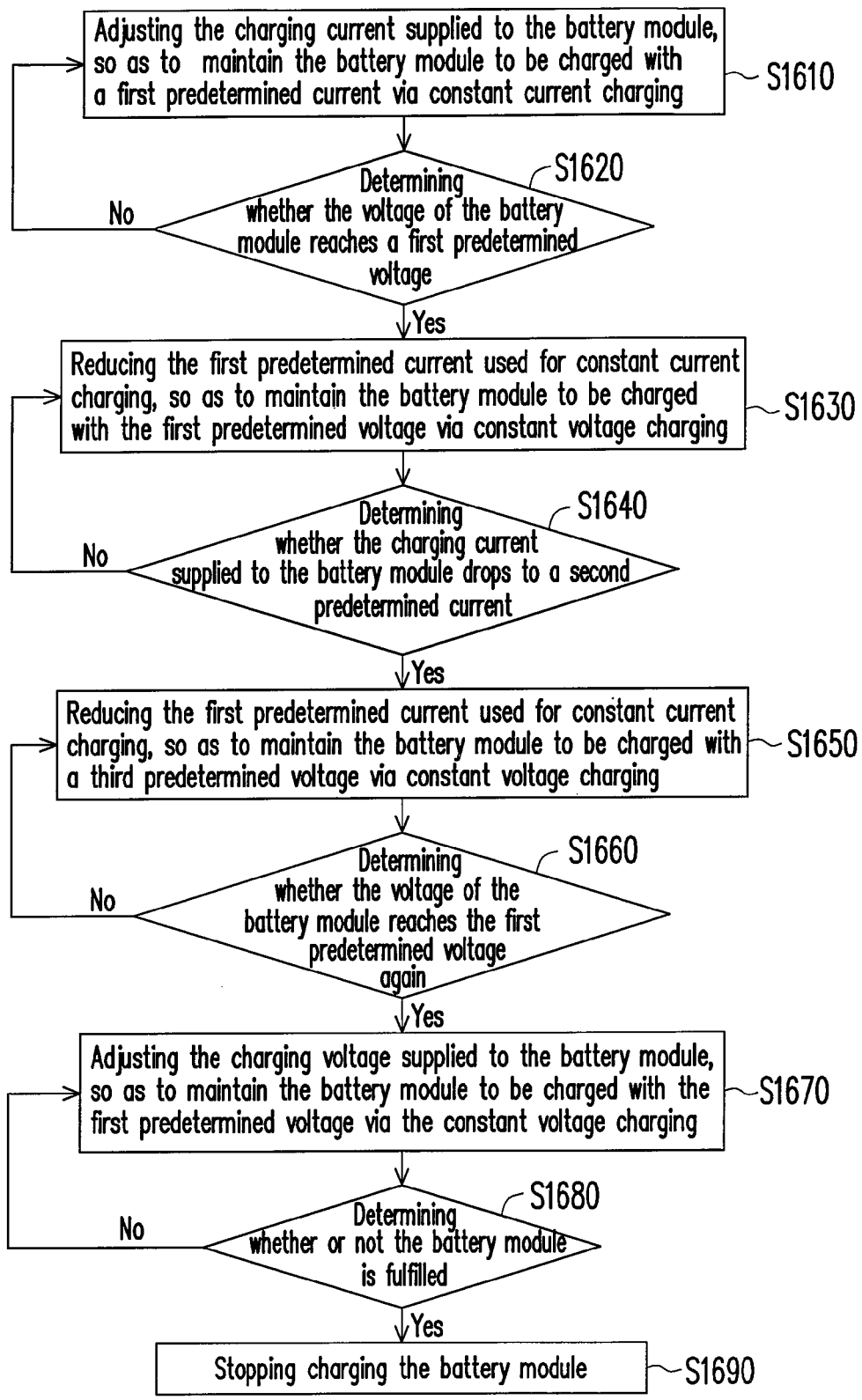
FIG. 16 is a flowchart illustrating a method for charging a battery module in multiple stages according to a sixth embodiment of the present invention.
Figure 17:
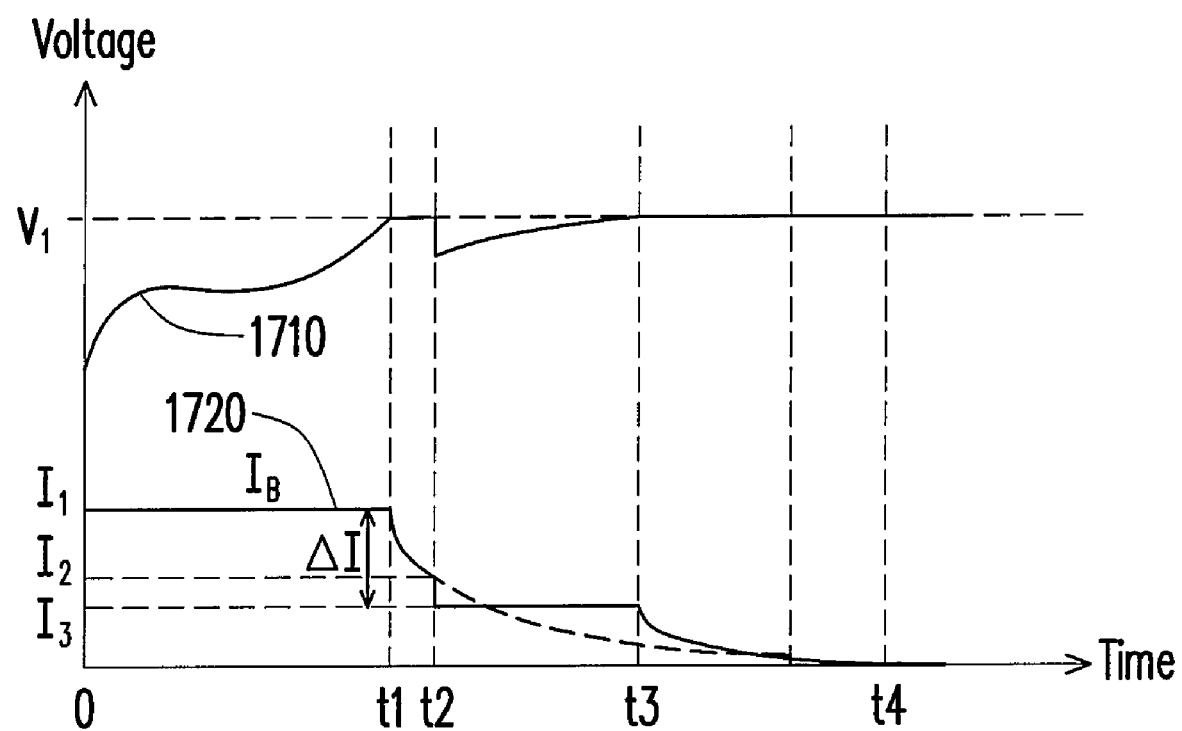
FIG. 17 is a diagram illustrating a charging curve of a battery module according to a sixth embodiment of the-present invention.

FIG. 16 is a flowchart illustrating a method for charging a battery module in multiple stages according to a sixth embodiment of the present invention. FIG. 17 is a diagram illustrating a charging curve of a battery module according to a sixth embodiment of the present invention. Referring to FIG. 16 and FIG. 17, in the present embodiment, a battery module is charged through controlling the charring current. Different from the fifth embodiment, the present embodiment includes four charging stages. In a first charging stage ($t=0\sim t_1$), the charging current supplied to the battery module is adjusted for maintaining the battery module to be charged with a first predetermined current $I_1$ via constant current charging (step S1610). The voltage of the battery module may be varied with the increasing of the received current, and gradually forms a voltage curve 1710 of FIG. 17 varied along with time.

Next, whether or not the voltage of the battery module reaches a first predetermined voltage $V_1$ is determined (step S1620). Wherein, if the voltage of the battery module reaches the first predetermined voltage $V_1$, it represents the charging voltage supplied to the battery module reaches the maximum voltage that the battery module may bear. Now, to ensure the safety of the battery module, a second charging stage ($t=t_1\sim t_2$) of the present embodiment is then started, in which the first predetermined current $I_1$ used for constant current charging is gradually decreased, so as to maintain the battery module to be charged with the first predetermined voltage $V_1$ via the constant voltage charging (step S1630).

During the constant voltage charging, since the battery module is gradually charged to be full, the charging current supplied to the battery module drops gradually. Now, to ensure the safety of the battery module, whether or not the charging current supplied to the battery module drops to a second predetermined current $I_2$ is determined (step S1640). When the charging current supplied to the battery module drops to the second predetermined current $I_2$, a third charging stage ($t=t_2\sim t_3$) of the present embodiment is then started, by which the battery module originally maintained to be charged with the first predetermined voltage $V_1$ via the constant voltage charging is now changed to be charged with a third predetermined current $I_3$ via the constant current charging (step S1650). Similar to the second predetermined current $I_2$ of the fifth embodiment, the third predetermined current $I_3$ equals to the first predetermined current $I_1$ minus a current difference value $\Delta I$, and the current difference value $\Delta I$ may be 20%~50% of the first predetermined current $I_1$ used for constant current charging, which is not strictly limited.

It should be noted that while maintaining the battery module to be charged with the third predetermined current $I_3$ via the constant current charging, whether or not the voltage of the battery module reaches the first predetermined voltage $V_1$ again is further determined (step S1660). As described above, the first predetermined voltage $V_1$ is a maximum voltage that the battery module may bear for safe operation. When the voltage of the battery module again reaches the first predetermined voltage $V_1$, it represents the first predetermined voltage $V_1$ is approximately fulfilled, and a fourth charging stage ($t=t_3\sim t_4$) of the present embodiment is then started, by which the charging voltage supplied to the battery module is adjusted, so as to maintain the battery module to be charged with the first predetermined voltage $V_1$ via the constant voltage charging (step S1670).

Finally, whether or not the battery module is fulfilled is determined (step S1680). If the battery module is determined to be fulfilled, the charging of the battery module is then stopped (step S1690); on the other hand, if the battery module is still not fulfilled, the step S1670 is repeated for continuously charging the battery module by the constant voltage charging until the battery module is fulfilled.

The Seventh Embodiment

Compared to the sixth embodiment which delays the time point for "greatly reducing the charging current", in the present embodiment, the time point for "greatly reducing the charging current" is moved forward, namely, the rated voltage used for determining whether to reduce the charging current is reduced, so as to reduce the charging current as early as possible for protecting the battery module.

Figure 18:
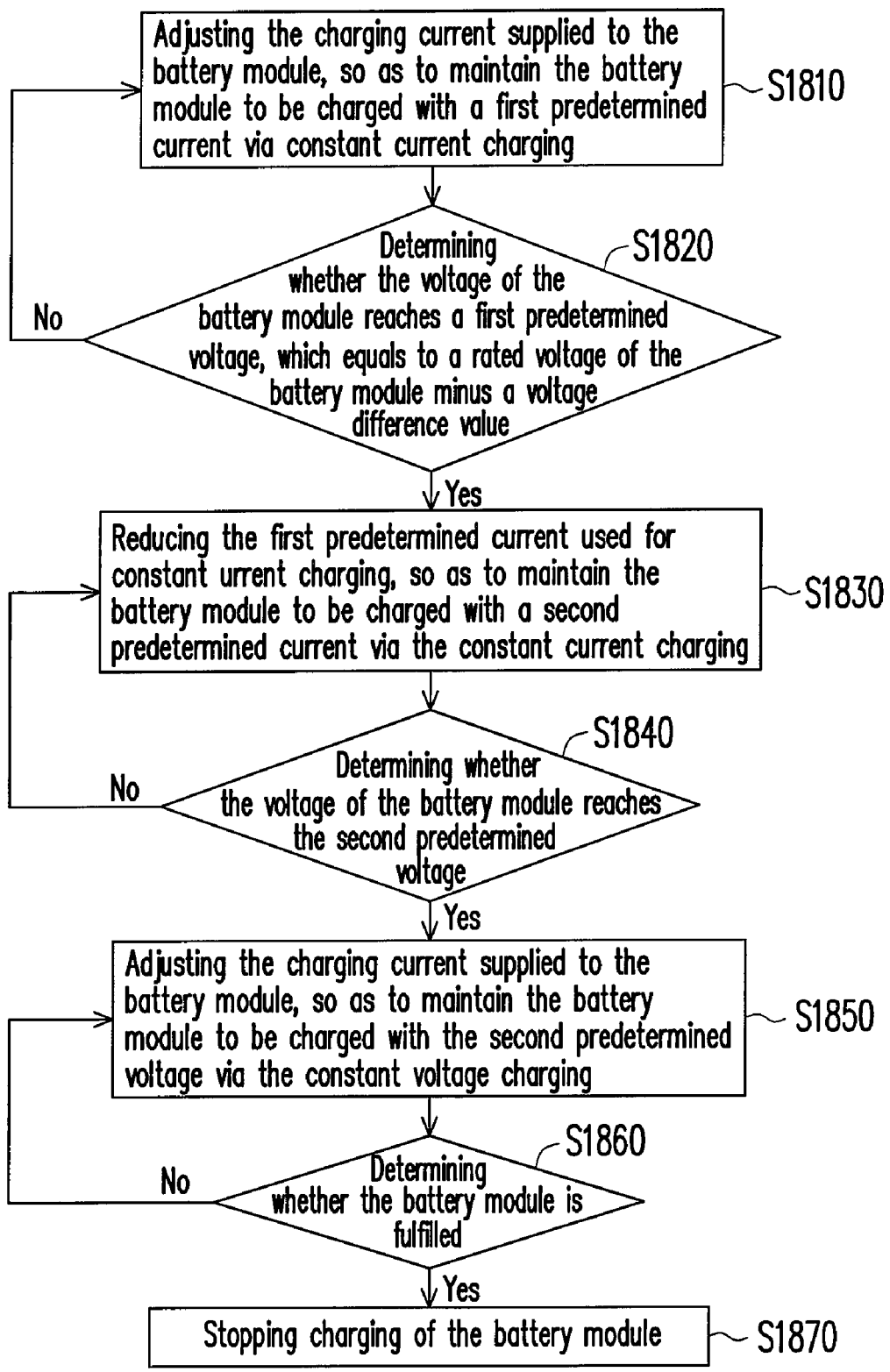
FIG. 18 is a flowchart illustrating a method for charging a battery module in multiple stages according to a seventh embodiment of the present invention.
Figure 19:
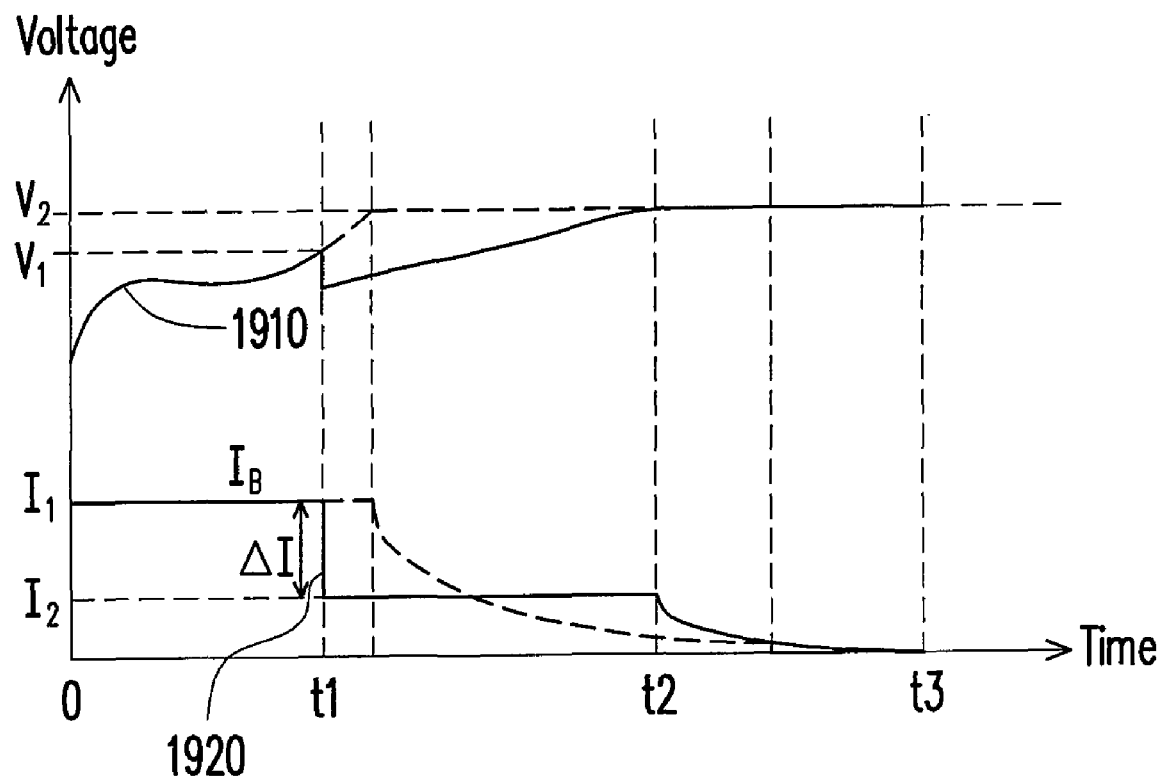
FIG. 19 is a diagram illustrating a charging curve of a battery module according to a seventh embodiment of the present invention.

FIG. 18 is a flowchart illustrating a method for charging a battery module in multiple stages according to a seventh embodiment of the present invention. FIG. 19 is a diagram illustrating a charging curve of a battery module according to a seventh embodiment of the present invention. Referring to FIG. 18 and FIG. 19, in the present embodiment, a battery module is charged through controlling the charring current. The present embodiment includes three charging stages. In a first charging stage ($t=0 \sim t_1$), the charging current supplied to the battery module is also adjusted for maintaining the battery module to be charged with a first predetermined current $I_1$ via constant current charging (step S1810). The voltage of the battery module may be varied with the increasing of the received current, and gradually forms a voltage curve 1910 of FIG. 19 varied along with time.

Next, whether or not the voltage of the battery module reaches a first predetermined voltage $V_1$ is determined (step S1820). It should be noted that the difference between the present embodiment and the sixth embodiment is that the first predetermined voltage $V_1$ is set to be a maximum voltage (i.e. a rated voltage of the battery module) that the battery module may bear for safe operation minus a voltage difference value $\Delta V$, so as to reduce the charging voltage as early as possible for protecting the battery module.

Back to the step S1820, if the voltage of the battery module reaches the first predetermined voltage $V_1$, it represents the charging voltage supplied to the battery module reaches the maximum voltage that the battery module may bear. Now, to ensure the safety of the battery module, a second charging stage ($t=t_1 \sim t_2$) of the present embodiment is then started, in which the first predetermined current $I_1$ used for constant current charging is decreased, so as to maintain the battery module to be charged with a second predetermined current $I_2$ via the constant current charging (step S1830), wherein the second predetermined current $I_2$ equals to the first predetermined current $I_1$ minus a current difference value $\Delta I$, and the current difference value $\Delta I$ may be 20%~50% of the first predetermined current $I_1$ used for constant current charging, which is not strictly limited.

It should be noted that while maintaining the battery module to be charged with the second predetermined current $I_2$ via the constant current charging, whether or not the voltage of the battery module reaches a second predetermined voltage $V_2$ again is further determined (step S1840). The second predetermined voltage $V_2$ is the maximum voltage (i.e. the rated voltage of the battery module) that the battery module may bear for safe operation. When the voltage of the battery module reaches the second predetermined voltage $V_2$, it represents the battery module is approximately fulfilled, and now a third charging stage ($t=t_2 \sim t_3$) of the present embodiment is started, in which the charging current supplied to the battery module is adjusted, so as to maintain the battery module to be charged with the second predetermined voltage $V_2$ via the constant voltage charging (step S1850).

Finally, whether or not the battery module is fulfilled is determined (step S1860). If the battery module is determined to be fulfilled, the charging of the battery module is then stopped (step S1870); on the other hand, if the battery module is still not fulfilled, the step S1860 is repeated for continuously charging the battery module by the constant voltage charging, until the battery module is fulfilled.

In the aforementioned third to the seventh embodiments, the battery module is charged based on the "control of the charging current". However, as a relation between the second embodiment (the control of the charging voltage) and the first embodiment (the control of the charging current), in the third to the seventh embodiments, the battery module may also be charged based on the "control of the charging voltage", and the charging methods thereof are the same or similar to that of the second embodiment, and the detailed description thereof will not be repeated.

In summary, the method for charging a battery module in multiple stages of the present invention has at least the following advantages:

1. By supervising the voltage of each parallely-connected battery cell set in the battery module, over charging of the parallely-connected battery cell sets may be avoided, such that tge safety of the parallely-connected battery cell sets is ensured.
2. By applying the charging method in multiple stages, not only the charging safety is ensured, but also the charging speed is improved.
3. By applying the charging method with the current control or the voltage control, the charging power may be effectively utilized, so as to cope with various requirements of users.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for charging a battery module of a portable electronic apparatus in multiple stages, suitable for the battery module comprising a plurality of parallely-connected battery cell sets, the method comprising:
   x. charging the battery module via a trickle charging;
   y. determining whether or not the voltage of the battery module reaches a charging starting voltage;
   a. charging the battery module with a first predetermined current via constant current charging if the voltage of the battery module reaches the charging starting voltage;
   b. determining whether or not the voltage of any parallely-connected battery cell set in the battery module reaches a first predetermined voltage;
   c. charging the battery module with a second predetermined current via the constant current charging, wherein the second predetermined current equals to the first predetermined current minus a current difference value;
   d. determining whether or not the voltage of any parallely-connected battery cell set in the battery module reaches a second predetermined voltage;

e. maintaining the battery module to be charged with the second predetermined voltage via constant voltage charging;

f. determining whether or not the battery module is fulfilled; and g. maintaining the battery module to be charged with the second predetermined voltage via the constant voltage charging until the battery module is fulfilled.

2. The method for charging a battery module in multiple stages as claimed in claim 1, wherein the first predetermined voltage and the second predetermined voltage are a maximum voltage that the parallely-connected battery cell sets may bear for safe operation.

3. The method for charging a battery module in multiple stages as claimed in claim 1, wherein the first predetermined voltage equals to a maximum voltage that the parallely-connected battery cell sets may bear for safe operation minus a voltage difference value, and the second predetermined voltage is the maximum voltage that the parallely-connected battery cell sets may bear for safe operation.

4. The method for charging a battery module in multiple stages as claimed in claim 1, wherein when the voltage of one of the parallely-connected battery cell sets reaches the first predetermined voltage, the step c. further comprises:

adjusting the power supplied to the battery module for maintaining the parallely-connected battery cell set having the maximum voltage to be charged with the first predetermined voltage via the constant voltage charging; and determining whether or not the current flowing through the parallely-connected battery cell set having the maximum voltage reaches a third predetermined current, wherein if the current of the parallely-connected battery cell set having the maximum voltage reaches the third predetermined current, the power supplied to the battery module is adjusted again for maintaining the parallely-connected battery cell set having the maximum voltage to be charged with the second predetermined current via the constant current charging.

5. The method for charging a battery module in multiple stages as claimed in claim 1, wherein after the step b., the method further comprises:

going back to step a. for continuously maintaining the battery module to be charged with the first predetermined current via the constant current charging if the voltage of each parallely-connected battery cell set still not reaches the first predetermined voltage.

6. The method for charging a battery module in multiple stages as claimed in claim 4, wherein method for adjusting the power supplied to the battery module comprises adjusting a charging current or a charging voltage supplied to the battery module.

7. The method for charging a battery module in multiple stages as claimed in claim 6, wherein if the method for adjusting the power supplied to the battery module is to adjust the charging current, the step e. of adjusting the power supplied to the battery module for maintaining the battery module to be charged with the second predetermined voltage via constant voltage charging further comprises:

e1. reducing the charging current supplied to the battery module by a level;

e2. determining whether or not the voltage of any parallely-connected battery cell set in the battery module reaches the second predetermined voltage;

e3. reducing the charging current supplied to the battery module by the level again when the voltage of one of the parallely-connected battery cell sets reaches the second predetermined voltage; and e4. repeating the steps e2 and e3 for maintaining the battery module to be charged with the second predetermined voltage via the constant voltage charging.

8. The method for charging a battery module in multiple stages as claimed in claim 6, wherein if the method for adjusting the power supplied to the battery module is to adjust the charging voltage, the step e. of adjusting the power supplied to the battery module for maintaining the battery module to be charged with the second predetermined voltage via constant voltage charging further comprises:

e1. reducing the charging voltage supplied to the battery module by a level;

e2. determining whether or not the voltage of any parallely-connected battery cell set in the battery module reaches the second predetermined voltage;

e3. reducing the charging voltage supplied to the battery module by the level again when the voltage of one of the parallely-connected battery cell sets reaches the second predetermined voltage; and e4. repeating the steps e2 and e3 for maintaining the battery module to be charged with the second predetermined voltage via the constant voltage charging.

9. The method for charging a battery module in multiple stages as claimed in claim 1, wherein method of determining whether or not the battery module is fulfilled comprises:

determining whether or not the current flowing through the battery module is less than a minimum current;

determining the battery module to be fulfilled if the current flowing through the battery module is less than the minimum current; and determining the battery module to be still not fulfilled if the current flowing through the battery module is greater than the minimum current.

10. The method for charging a battery module in multiple stages as claimed in claim 1, wherein each parallely-connected battery cell set comprises a plurality of cells which are connected in parallel.

11. A method for charging a battery module of a portable electronic apparatus in multiple stages, suitable for the battery module, the method comprising:

x. charging the battery module via a trickle charging;

y. determining whether or not the voltage of the battery module reaches a charging starting voltage;

a. charging the battery module with a first predetermined current via constant current charging if the voltage of the battery module reaches the charging starting voltage;

b. determining whether or not the voltage of the battery module reaches a first predetermined voltage;

c. charging the battery module with a second predetermined current via the constant current charging, wherein the second predetermined current equals to the first predetermined current minus a current difference value;

d. determining whether or not the voltage of the battery module reaches a second predetermined voltage;

e. maintaining the battery module to be charged with the second predetermined voltage via constant voltage charging;

f. determining whether or not the battery module is fulfilled; and g. maintaining the battery module to be charged with the second predetermined voltage via the constant voltage charging until the battery module is fulfilled.

12. The method for charging a battery module in multiple stages as claimed in claim 11, wherein the first predetermined voltage and the second predetermined voltage are a maximum voltage that the battery module may bear for safe operation.

13. The method for charging a battery module in multiple stages as claimed in claim 11, wherein the first predetermined voltage equals to a maximum voltage that the battery module may bear for safe operation minus a voltage difference value, and the second predetermined voltage is the maximum voltage that the battery module may bear for safe operation.

14. The method for charging a battery module in multiple stages as claimed in claim 11, wherein when the voltage of the battery module reaches the first predetermined voltage, the step c. further comprises:
   adjusting the power supplied to the battery module for maintaining the battery module to be charged with the first predetermined voltage via the constant voltage charging; and
   determining whether or not the current flowing through the battery module reaches a third predetermined current, wherein if the current flowing through the battery module reaches the third predetermined current, the power supplied to the battery module is adjusted again for maintaining the battery module to be charged with the second predetermined current via the constant current charging.

15. The method for charging a battery module in multiple stages as claimed in claim 11, wherein after the step b., the method further comprises:
   going back to step a. for continuously maintaining the battery module to be charged with the first predetermined current via the constant current charging if the voltage of the battery module still not reaches the first predetermined voltage.

16. The method for charging a battery module in multiple stages as claimed in claim 14, wherein method for adjusting the power supplied to the battery module comprises adjusting a charging current or a charging voltage supplied to the battery module.

17. The method for charging a battery module in multiple stages as claimed in claim 16, wherein if the method for adjusting the power supplied to the battery module is to adjust the charging current, the step e. of adjusting the power supplied to the battery module for maintaining the battery module to be charged with the second predetermined voltage via constant voltage charging further comprises:
   e1. reducing the charging current supplied to the battery module by a level;
   e2. determining whether or not the voltage of the battery module reaches the second predetermined voltage;
   e3. reducing the charging current supplied to the battery module by the level again when the voltage of the battery module reaches the second predetermined voltage; and
   e4. repeating the steps e2 and e3 for maintaining the battery module to be charged with the second predetermined voltage via the constant voltage charging.

18. The method for charging a battery module in multiple stages as claimed in claim 16, wherein if the method for adjusting the power supplied to the battery module is to adjust the charging voltage, the step e. of adjusting the power supplied to the battery module for maintaining the battery module to be charged with the second predetermined voltage via constant voltage charging further comprises:
   e1. reducing the charging voltage supplied to the battery module by a level;
   e2. determining whether or not the voltage of the battery module reaches the second predetermined voltage;
   e3. reducing the charging voltage supplied to the battery module by the level again when the voltage of the battery module reaches the second predetermined voltage; and
   e4. repeating the steps e2 and e3 for maintaining the battery module to be charged with the second predetermined voltage via the constant voltage charging.

19. The method for charging a battery module in multiple stages as claimed in claim 11, wherein method of determining whether or not the battery module is fulfilled comprises:
   determining whether or not the current flowing through the battery module is less than a minimum current;
   determining the battery module to be fulfilled if the current flowing through the battery module is less than the minimum current; and
   determining the battery module to be still not fulfilled if the current flowing through the battery module is greater than the minimum current.

* * * * *